(12) United States Patent  
Ogawa

(10) Patent No.: US 7,113,664 B2  
(45) Date of Patent: Sep. 26, 2006

(54) OPTICAL WAVEGUIDE SWITCH AND METHOD OF MANUFACTURING THE SAME

(75) Inventor: Tsuyoshi Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/300,252

(22) Filed: Dec. 14, 2005

(65) Prior Publication Data

US 2006/0098916 A1    May 11, 2006

Related U.S. Application Data

(62) Division of application No. 10/764,178, filed on Jan. 23, 2004.

(30) Foreign Application Priority Data

Jan. 22, 2003    (JP)    ............................. 2003-013857

(51) Int. Cl.
*G02B 6/35*    (2006.01)
(52) U.S. Cl. ...................................................... 385/16
(58) Field of Classification Search .................. 385/16
See application file for complete search history.

(56) References Cited

U.S. PATENT DOCUMENTS 5,367,585 A * 11/1994 Ghezzo et al. ................ 385/23
6,800,425 B1 * 10/2004 Naitou et al. ............... 430/321
2003/0223675 A1 * 12/2003 Berger et al. .................. 385/16

\* cited by examiner

*Primary Examiner*—Michelle Connelly-Cushwa
(74) *Attorney, Agent, or Firm*—Sonnenschein Nath & Rosenthal LLP

(57) ABSTRACT

Optical waveguides facing each other with a layer-to-layer spacing kept not to permit the occurrence of a proximity effect perturbation within a gap section formed in an intermediate layer are configured so that at least one of the optical waveguides is moved toward the other facing the one optical waveguide with drive to cause the occurrence of the proximity effect perturbation between the optical waveguides. Thus, optical signal switching or translation takes place by coupling optical signals transmitted through the optical waveguides with each other by the proximity effect perturbation.

10 Claims, 20 Drawing Sheets

OPTICAL WAVEGUIDE SWITCH AND METHOD OF MANUFACTURING THE SAME

CROSS REFERENCE TO RELATED APPLICATIONS

The present application is a divisional of U.S. application Ser. No. 10/764,178, filed Jan. 23, 2004, incorporated herein by reference to the extent permitted by law, both of which claim priority to Japanese Priority Application No. JP2003-013857, filed Jan. 22, 2003.

BACKGROUND OF THE INVENTION

1. Field of the Invention

The present invention relates to an optical waveguide switch, which is formed on optical waveguides for optical signal transmission to perform optical signal switching or translation and the like, and also a method of manufacturing the optical waveguide switch.

2. Description of the Related Art

Various digital electronic apparatuses such as personal computers, mobile phones, video apparatuses and audio apparatuses, for instance, are mounted with a large number of integrated circuit elements such as various kinds of Integrated Circuit (IC) elements, Large Scale Integration (LSI) elements and memory elements. In the integrated circuit elements, efforts have been made to attain increased functionality, multi-functionality, increased speed processing with sharply increasing operation speed, etc., in addition to form-factor reductions such as size, weight and thickness with micro-fabrication of interconnect patterns, downsizing of IC packages, rapid progress of integration scales, implementation of multi-pinning or improvement of packaging methods such as packaging technologies of chip size package (CSP).

Signal transmission in integrated circuit elements and the like, including relatively short-distance signal transmission such as transmission between intra-board integrated circuit elements, for instance, takes place typically with electrical signals transmitted through electrical interconnects. In the signal transmission, efforts are being made to further increase a transmission performance in consideration of needs of increased speed transmission of information signals, increased density of signal patterns and the like in the future. However, an approach to an increased transmission performance with electrical interconnects has transmission performance limitations. Specifically, the signal transmission with the electrical interconnects needs to take measures against intra-interconnect pattern problems such as delayed signal transmission with a Capacitance Resistance (CR) time constant, Electromagnetic Interference (EMI) noise and Electromagnetic Compatibility (EMC) or problems such as inter-interconnect pattern crosstalk and so on.

In the signal transmission, the use of optical signal transmission with an optical interconnect technology realized with optical interconnects, optical interconnections or the like has been noted to settle the above electrical signal transmission problems attributable to the electrical interconnects. The optical signal transmission may ensure that transmission of information signals and the like between apparatuses, intra-apparatus boards or intra-board integrated circuit elements is attainable at high speed. Particularly, in the short-distance transmission such as inter-integrated circuit element transmission, for instance, the optical signal transmission forms an optical waveguide formed on a substrate with the integrated circuit elements packaged to attain high-speed large-capacity optical signal transmission with the optical waveguide as a transmission line, and thus enables suitable building of a transmission system for the information signals and the like to be attained.

For the above optical signal transmission, the various electronic apparatuses, etc. need to be mounted on a hybrid circuit substrate with electrical and optical interconnects embedded together. The hybrid circuit substrate employs a substrate such as a silicon substrate and a glass substrate, for instance, having a surface obtained by planarization. The hybrid circuit substrate has, on a surface thereof, an optical waveguide together with accurate micro-fabricated multi-thin layered electrical interconnect patterns. In the optical waveguide, a photoconductive resin material that is applicable to a low temperature process for patterning with a photolithography, for instance, is suitably used as a material for forming of the optical waveguide.

SUMMARY OF THE INVENTION

By the way, when the above hybrid circuit substrate is mounted with the plurality of integrated circuit elements or the like to carry out mutual signal transfer between the integrated circuit elements, a switch means for controlling transmission line switching is required. In the hybrid circuit substrate, the switch means preferably employs an optical switch that is adapted to direct switching or translation of optical signals transmitted through the optical interconnects without causing conversion into the electrical signals. The hybrid circuit substrate ensures that optical signal transmission takes place through switching or translation with the optical switch, with a high-speed large-capacity transmission maintained by suppressing an optical signal transmission loss.

As for the optical switch, various kinds of optical switches have been proposed, such as an electro-optical switch using a ferroelectric material such as $LiNbO_3$ crystal and Ti and an optical semiconductor material, an optical gate switch using a semiconductor material, an acoustic optical switch applying a guided light diffraction effect with a surface acoustic wave, a magneto-optical switch using a material such as a rare earth garnet material showing a large magneto-optical effect and a thermo-optical carries out witch applying a refractive index change with a dielectric temperature change. However, the above conventional optical switches are all relatively expensive, and need to be formed within the optical interconnect as a device independent of the optical waveguide, resulting in disadvantages of requiring a complicated connection work and causing a transmission loss in a connection section.

In the hybrid circuit substrate, transmission of a plurality of signals such as control signals, data signals and address signals frequently takes place between the integrated circuit elements. Thus, in the hybrid circuit substrate, an optical switch capable of carrying out simultaneous switching between the plurality of optical interconnects is also desired. As for the optical switch of this kind, an optical switch configured with the above discrete optical switches integrated in a matrix shape on a substrate has been proposed. However, this optical switch involves disadvantages of requiring a complicated structure and not being cost-effective.

The present invention has been conceived to provide a simple-structured, small-sized, inexpensive optical waveguide switch, which may carry out switching or translation of a plurality of optical signals transmitted through multi-layered optical waveguides at high accuracy with a reduction of loss attained, and also a method of manufacturing the optical waveguide switch.

An optical waveguide switch according to a preferred embodiment of the present invention comprises a plurality of optical waveguides that are at least in two layers with a layer-to-layer spacing kept not to permit the occurrence of a proximity effect perturbation in a spontaneous manner; a gap section provided in a predetermined axial length between the paired optical waveguides composed of the upper and lower optical waveguides; and an optical waveguide drive of driving at least one of the paired optical waveguides for movement toward the other facing the one optical waveguide within the gap section to cause the occurrence of the proximity effect perturbation between the optical waveguides.

According to the optical waveguide switch of the preferred embodiment of the present invention having the above configuration, the optical signals such as control signals, data signals and address signals are transmitted through each optical waveguide that optically interconnects integrated circuit elements mounted on a substrate, for instance. According to the optical waveguide switch, at least a first optical waveguide is moved within the gap section with the optical waveguide drive from a first position where the first optical waveguide is apart from a second optical waveguide facing the first optical waveguide to a second position where the proximity effect perturbation is made occur. According to such an optical waveguide switch, optical signal transmission takes place through switching of the transmitted optical signal toward the second optical waveguide by coupling the first optical waveguide and the second optical waveguide with each other by the proximity effect perturbation. According to the optical waveguide switch, optical signal transmission also takes place through optical signal translation by making the optical signals transmitted through the first optical waveguide and the second optical waveguide to be superposed on each other. According to the optical waveguide switch, optical signal switching or translation takes place by directly driving the optical waveguides with the optical waveguide drive, leading to advantages of providing a simple structure and attaining a reduction of loss. According to the optical waveguide switch, a thick film deposition technology or the like may be applied to provide an accurate and relatively small optical waveguide switch on the substrate.

A method for manufacturing the optical waveguide switch according to another preferred embodiment of the present invention includes the steps of forming a first optical waveguide layer having a core layer sealed by a lower clad layer and an upper clad layer comprising photoconductive resin material; forming a first electrode layer on an upper clad layer of the first optical waveguide layer with a photoconductive electrode material; forming an intermediate layer of a predetermined thickness on a predetermined area extending across the upper clad layer of the first optical waveguide layer and the first electrode layer; filling a fill-up material into a gap section comprising a non-forming area of the intermediate layer on the upper clad layer of the first optical waveguide layer; forming a second electrode layer facing the first electrode layer with a photoconductive electrode material across the intermediate layer and the fill-up material layer; forming a second optical waveguide layer facing the first optical waveguide layer and having a core layer sealed by a lower clad layer and an upper clad layer comprising a photoconductive resin material on the upper clad layer including the second electrode layer,; and forming the gap section by removing the fill-up material from the fill-up material layer; wherein the optical waveguide switch is manufactured, in which the first optical waveguide layer and the second optical waveguide layer face each other by having an interlayer spacing kept for not permitting a spontaneous occurrence of a proximity effect perturbation, and optical signal switching or translation takes place by moving the first and second optical waveguide layers to a position where a proximity effect perturbation arises, by means of an electrostatic force generated by application of a voltage between the first electrode layer and the second electrode layer.

According to the method for manufacturing the optical waveguide switch having the above steps, an optical waveguide switch is manufactured, in which the first optical waveguide layer and the second optical waveguide layer face each other with a layer-to-layer spacing kept not to allow the occurrence of the proximity effect perturbation in a spontaneous manner, while optical signal switching or translation takes place by the optical waveguide layer movement within the gap section to a position where the proximity effect perturbation is made occur by an electrostatic force generated by application of a voltage to the first electrode layer and the second electrode layer. According to the method for manufacturing the optical waveguide switch, an inexpensive optical waveguide switch is manufactured, because of an advantage of providing constituent parts formed on the substrate with relatively simple deposition steps employing a photolithography or the like. According to the method for manufacturing the optical waveguide switch, an optical waveguide switch having a simple structure with a reduction of loss attained is manufactured, in which the optical waveguide drive of directly moving the optical waveguides is configured with the first electrode layer and the second electrode layer respectively on the first optical waveguide layer and the second optical waveguide layer facing each other, and optical signal switching or translation takes place between the first optical waveguide layer and the second optical waveguide layer by the proximity effect perturbation that is made occur with the movement of the optical waveguide layers so as to be close to each other through the optical waveguide drive. According to the method for manufacturing the optical waveguide switch, a precise miniaturized optical waveguide switch is manufactured at low cost, because of an advantage of providing the optical waveguide switch directly formed in portions of the optical waveguides on the substrate using the thick film deposition technology or the like.

According to the preferred embodiments of the present invention, the optical waveguides facing each other through the gap section formed in the intermediate layer with the layer-to-layer spacing kept not to cause the occurrences of the proximity effects perturbation are configured so that coupling of the transmitted optical signals takes place by permitting the proximity effect perturbation to arise between the optical waveguides by driving at least one of the optical waveguides with the drive for movement toward the other facing the one optical waveguide, resulting in advantages of providing the simple-structured, accurate and small-sized optical waveguide switch, and carrying out optical signal switching or translation at high accuracy in a signal coupled portion capable of attaining reduction of loss.

BRIEF DESCRIPTION OF THE DRAWINGS

The above features and advantages of the present invention will become more apparent in the following description of the preferred embodiments of the invention taken in conjunction with the accompanying drawings, in which.

DETAILED DESCRIPTION OF THE PREFERRED EMBODIMENTS OF THE PRESENT INVENTION

Figure 1:
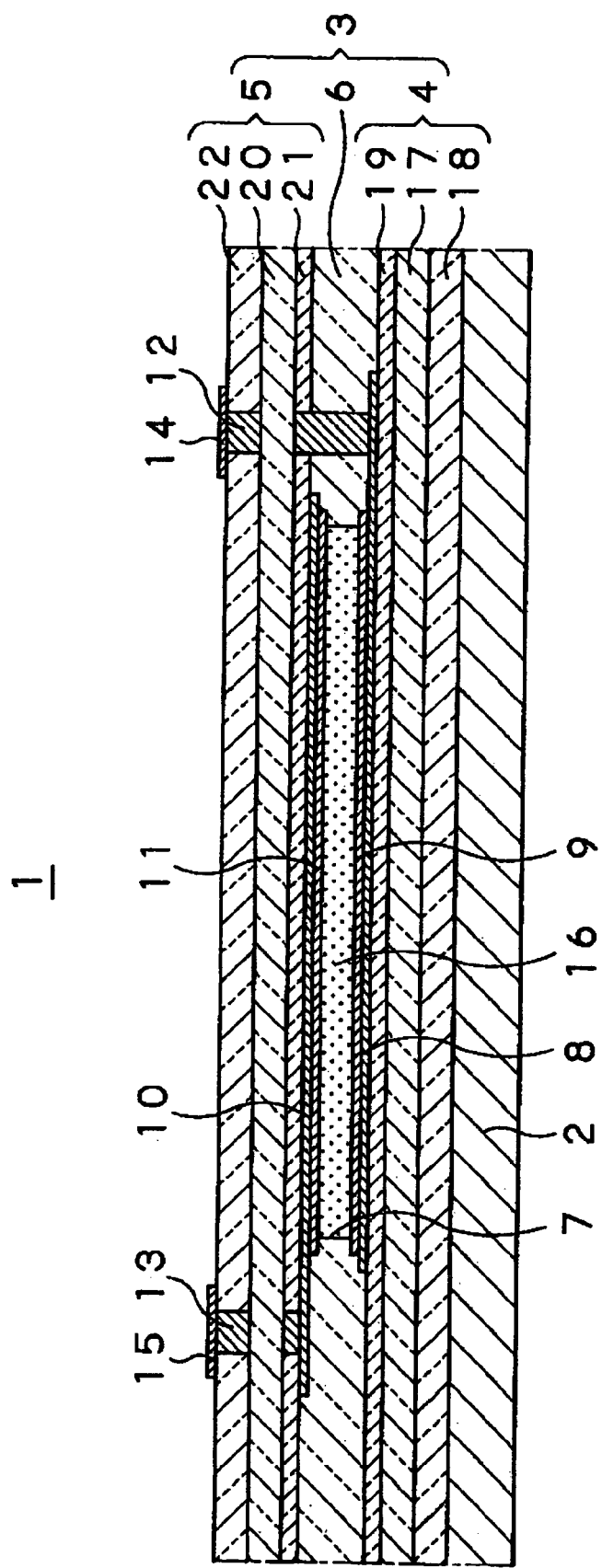
FIG. 1 is a longitudinal cross-sectional view of an optical waveguide switch according to a preferred embodiment of the present invention.

An optical waveguide switch 1 shown in FIG. 1 to FIG. 5 as a embodiment of the present invention is directly formed at a predetermined portion of an optical bus 3 composed of a first optical waveguide layer 4 and a second optical waveguide layer 5 that are in a layered arrangement on a surface of a substrate 2 mounted with a plurality of elements such as integrated circuit elements and electro-optical converting elements (not shown). The optical waveguide switch 1 ensures that the second optical waveguide layer 5 is moved into and out of contact with the first optical waveguide layer 4 within a predetermined area as will be detailed later, so that optical coupling takes place by a proximity effect perturbation that arises between the first optical waveguide layer 4 and the second optical waveguide layer 5 when the second optical waveguide layer 5 reaches a position near the first optical waveguide layer 4.

Figure 3:
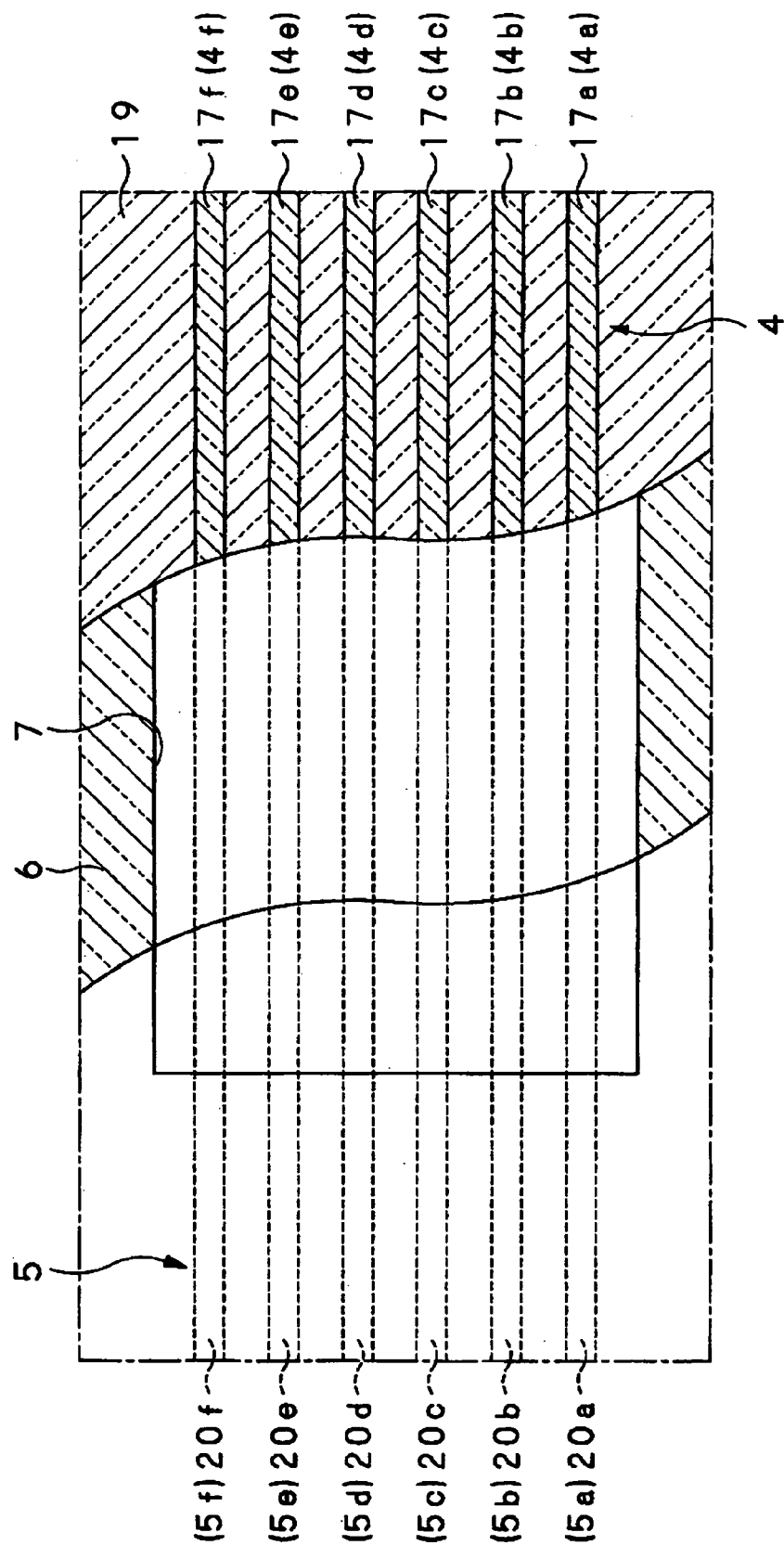
FIG. 3 is a partial cross-sectional plan view of the optical waveguide switch according to a preferred embodiment of the present invention.
Figure 4:
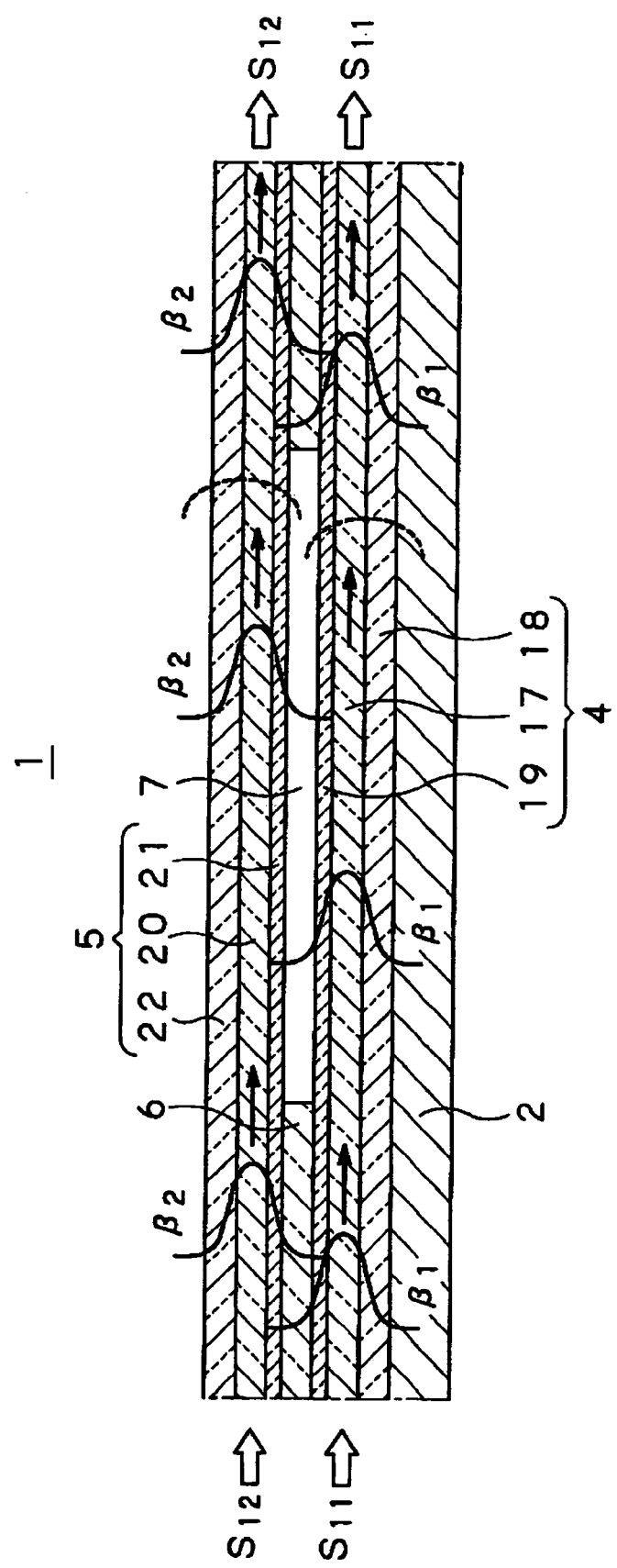
FIG. 4 illustrates a switching operation of the optical waveguide switch, more specifically, a non-switching operation condition according to a preferred embodiment of the present invention.
Figure 5:
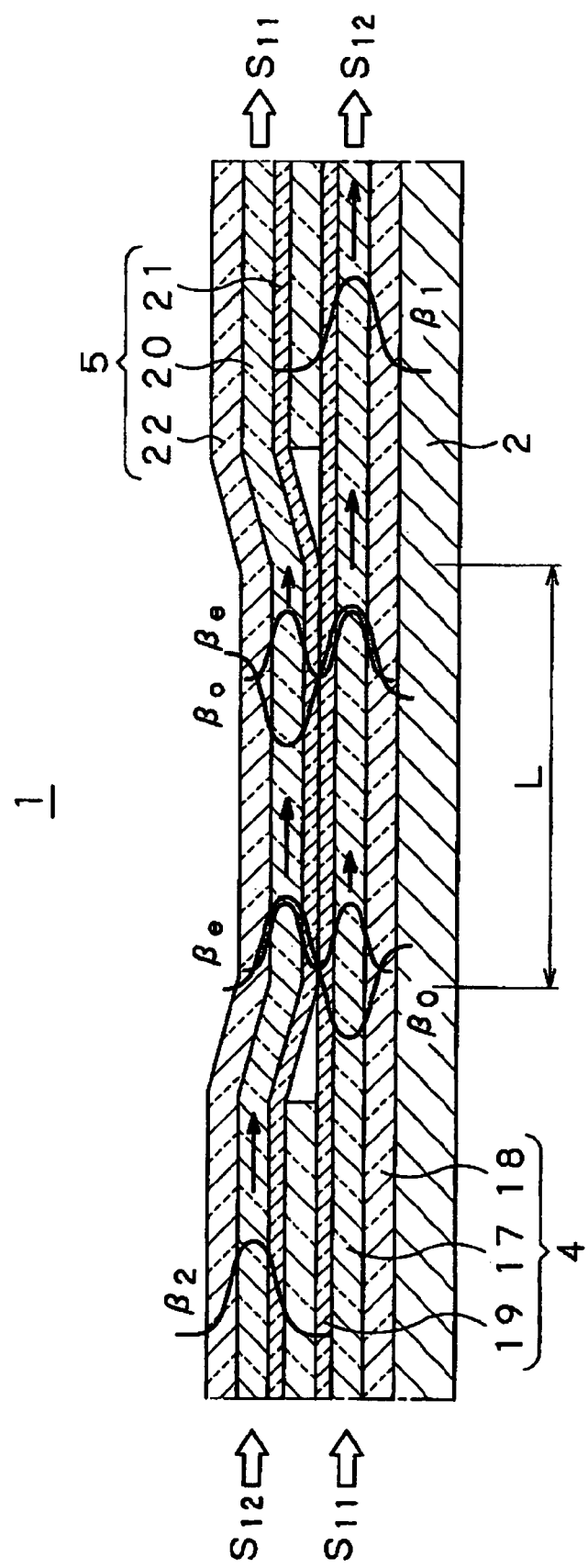
FIG. 5 illustrates a switching operation of the optical waveguide switch, more specifically, a switching operation condition according to a preferred embodiment of the present invention.

With non-coupling and coupling between the first optical waveguide layer 4 and the second optical waveguide layer 5, the optical waveguide switch 1 carries out switching or translation of optical signals such as control signals, data signals and address signals that are mutually transferred from each integrated circuit element to the optical bus 3 through the electro-optical converting element by input/output operations. It is noted that a detailed configuration of the optical waveguide switch 1 is shown in FIG. 1, an essential part thereof is shown in FIGS. 2 and 3, and an operating condition thereof is shown in FIGS. 4 and 5.

The substrate 2 employs a silicon substrate or a glass substrate, for instance, that may form a relatively accurate flat face. In addition to the optical bus 3, the substrate 2 also has a multi-layered appropriate interconnect pattern (not shown) for interconnecting each integrated circuit element and the electro-optical converting element. The substrate 2 also has a packaging electric terminal (not shown) that is adapted to packaging of the substrate 2 on a packaging board such as an interposer and a motherboard, for instance.

Figure 2:
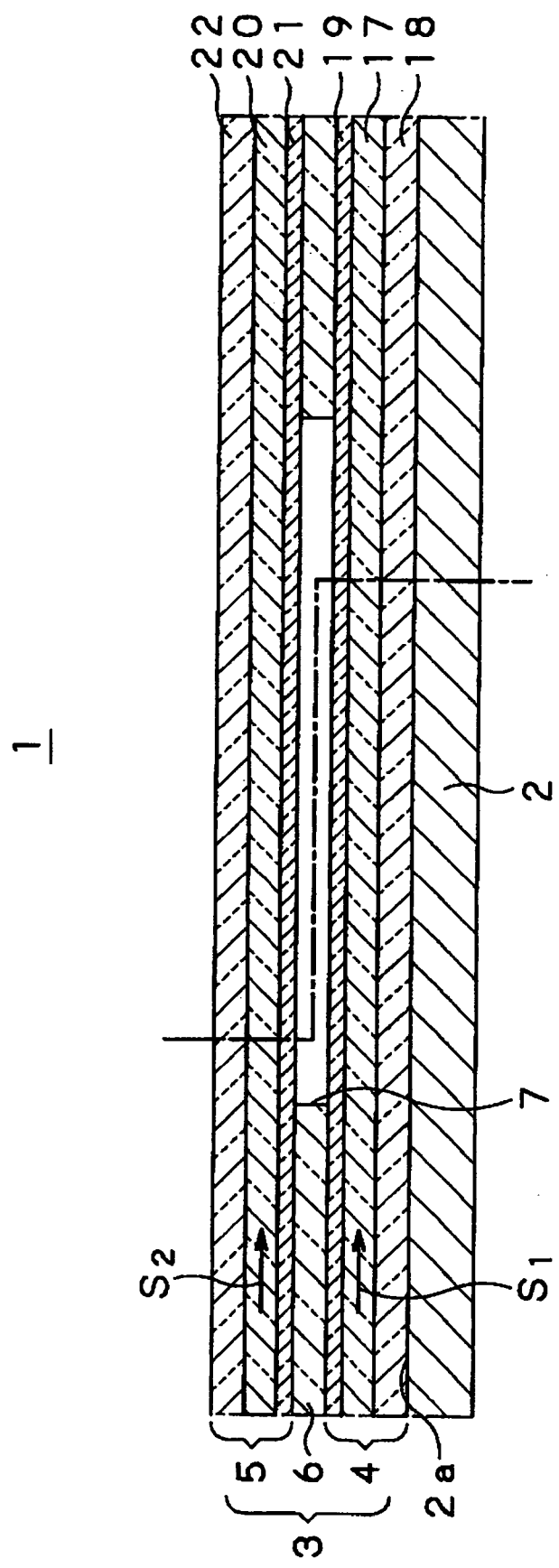
FIG. 2 is a longitudinal cross-sectional view of the optical waveguide switch according to a preferred embodiment of the present invention.

The optical bus 3 has the first optical waveguide layer 4 and the second optical waveguide layer 5 that are in a vertical two-layered arrangement on a surface of the substrate 2 as shown in FIGS. 1 and 2. The first optical waveguide layer 4 and the second optical waveguide layer 5 are respectively composed of a plurality of discrete optical waveguides 4a to 4f and 5a to 5f that are respectively in parallel with one another within the same layer, as shown in FIG. 3. The optical bus 3 also has an intermediate layer 6 between the first optical waveguide layer 4 and the second optical waveguide layer 5. The intermediate layer 6 is exploited to keep a layer-to-layer spacing between the first optical waveguide layer 4 and the second optical waveguide layer 5 so that the optical signals may be transmitted without being coupled with each other, in other words, without permitting the proximity effect perturbation to occur.

The optical waveguide switch 1 is directly formed on the surface of the substrate 2 with the first optical waveguide layer 4 and the second optical waveguide layer 5 as the components. The optical waveguide switch 1 comprises the first optical waveguide layer 4, the second optical waveguide layer 5, a gap section 7 formed in the intermediate layer 6, a first electrode layer 8 and a first short-circuit proof layer 9 that are in a layered arrangement on the first optical waveguide layer 4 so as to be situated on the gap section 7, and a second electrode layer 10 and a second short-circuit proof layer 11 that are in a layered arrangement on the second optical waveguide layer 5 so as to be situated on the gap section 7. The optical waveguide switch 1 also has a first via hole 12 that is to lead the first electrode layer 8 to a surface of the second optical waveguide layer 5 and a second via hole 13 that is to lead the second electrode layer 10. The optical waveguide switch 1 also has, on the second optical waveguide layer 5, a first connection terminal 14 and a second connection terminal 15 that are respectively connected to the first via hole 12 and the second via hole 13. The optical waveguide switch 1 also has, in the gap section 7, liquid 16 in a sealed condition therein.

The optical waveguide switch 1 forms the first optical waveguide layer 4 composed of a core 17 formed with a photoconductive resin material, and a lower clad layer 18 and an upper clad layer 19 respectively formed with a photoconductive resin material whose refractive index is lower than that of the resin material for the core 17. The lower clad layer 18 and the upper clad layer 19 are to seal the core 17. While the first optical waveguide layer 4 is based on a configuration composed of the plurality of discrete optical waveguides 4a to 4f as described above, the discrete optical wave guides 4a to 4f are configured so that discrete cores 17a to 17f formed by patterning in parallel with one another on the lower clad layer 18 are sealed by the lower clad layer 18 and the upper clad layer 19. The first optical waveguide layer 4 forms the discrete optical waveguides 4a to 4f spaced at intervals that ensure that the optical signals may be transmitted through these discrete optical waveguides independently without interfering each other.

The first optical waveguide layer 4 has, on the surface of the substrate 2, the lower clad layer 18 formed with the resin material coated in a uniform thickness throughout a waveguide forming area. The first optical waveguide layer 4 also has the core 17 formed by predetermined patterning to a resin layer deposited on the lower clad layer 18 by coating with the resin material that is to form the core 17. The first optical waveguide layer 4 also has the upper clad layer 19 formed with the resin material coated over the whole surface of the lower clad layer 18 so as to cover the core 17. The first optical waveguide layer 4 having the upper clad layer 19 is polished and planarized whenever required.

The first optical waveguide layer 4 also has the first electrode layer 8 formed thereon so as to cover a portion situated on the gap section 7 of the upper clad layer 19. The first electrode layer 8 is formed with a photoconductive electrode material such as Indium-Tin-Oxide (ITO) available for forming of a transparent electrode film, for instance, by predetermined patterning by means of etching to an electrode material layer deposited on a predetermined area of the upper clad layer 19. It is noted that when an electrode material having a lower photoconductivity was used for the first electrode layer 8, this first electrode layer 8 causes an increased absorption of an optical signal transmitted through the first optical waveguide layer 4 and thus hinders an overlap of propagation modes of optical signals transmitted through the first optical waveguide layer 4 and the second optical waveguide layer 5 as will be described later, leading to a disadvantage of sometimes providing a coupling-disable condition.

The first optical waveguide layer 4 also has the first short-circuit proof layer 9 throughout an area of the gap section 7 so as to cover the first electrode layer 8 situated on the gap section 7. The first short-circuit proof layer 9 is effective in preventing an excessive flow of current from occurring by direct contact of the first electrode layer 8 with the second electrode layer 10 when the second optical waveguide layer 5 is driven as will be detailed later. The first short-circuit proof layer 9 is formed by predetermined patterning process by means of etching an insulating layer deposited with a photoconductive insulating material such as silicon oxide ($SiO_2$) and silicon nitride (SiN), for instance. A photoconductive insulating material having refractive index substantially equal or lower than that of a clad material is preferably used for the first short-circuit proof layer 9 to have no effect on the propagation mode of the optical signal transmitted through the first optical waveguide layer 4.

The optical waveguide switch 1 also has, on the upper clad layer 19, the intermediate layer 6 formed in a deposited manner with a photoconductive resin material whose refractive index is equal or lower than that of the resin material for the upper clad layer, more specifically, a clad material coated in a predetermined thickness. The intermediate layer 6 is deposited in a thickness that ensures that the first optical waveguide layer 4 and the second optical waveguide layer 5 keep a layer-to-layer spacing not to permit the occurrence of the proximity effect perturbation in normal situation.

Deposition of the intermediate layer 6 on the upper clad layer 19 obtained by planarization forms the intermediate layer 6 having accurate thickness. With a process of applying masking to a predetermined area of the intermediate layer 6 in a length direction at the time of deposition, the gap section 7 is formed in a non-layer deposition portion for the intermediate layer 6. Alternatively, the intermediate layer 6 may also form the gap section 7 by a process of depositing a resin layer over the whole surface of the upper clad layer 19 and then removing the resin layer from a predetermined area by means of etching or the like. The intermediate layer 6 with a surface polished to be planarized is formed whenever required.

The gap section 7 makes the first short-circuit proof layer 9 of the first optical waveguide layer 4 be exposed through the intermediate layer 6. The gap section 7 forms an operating space section of the second optical waveguide layer 5 when the first optical waveguide layer 4 and the second optical waveguide layer 5 are optically coupled with each other as it will be described later. The gap section 7 is configured as an intra-layer sealed space section with the second optical waveguide layer 5 deposited thereon.

The gap section 7 has therein the liquid 16 in the sealed condition, instead of air, as described above. When the gap section 7 is one formed with air sealed therein, a difference in refractive index between the gap section 7 and the short-circuit proof layers 9, 10 respectively forming the actual surface layers is created, because of the fact that the refractive index of air is 1. The above refractive index difference very sensitively acts on a thickness control of the gap section 7, particularly, has great effect on an infra-described optical coupling operation of the first optical waveguide layer 4 with the second optical waveguide layer 5, leading to a disadvantage of easily creating operational variations. Accordingly, the gap section 7 needs to be filled with a filler whose refractive index is substantially equal to that of the short-circuit proof layers 9, 10. More specifically, the gap section 7 is filled with, as the filler, liquid such as appropriate oils, for instance, that form advantages of having no effect on the operation of the second optical waveguide layer 5 and being hardly volatile.

The second optical waveguide layer 5 is deposited on the intermediate layer 6 so as to close the gap section 7. Like the first optical waveguide layer 4, the second optical waveguide layer 5 is composed of a core 20 formed with a photoconductive resin material, and an upper clad layer 21 and a lower clad layer 22 respectively formed with a photoconductive resin material whose refractive index is lower than that of the material for the core 20. The upper clad layer 21 and the lower clad layer 22 are to seal the core 20. Deposition of the second optical waveguide layer 5 on the intermediate layer 6 obtained by planarization as described above forms an accurate second optical waveguide layer 5.

The second optical waveguide layer 5 is composed of discrete optical waveguides 5a to 5f that respectively make pairs with the discrete optical waveguides 4a to 4f of the first optical waveguide layer 4 so as to be apart into upper and lower layers. The second optical waveguide layer 5 forms the discrete optical waveguides 5a to 5f configured so that discrete cores 17a to 17f formed by patterning in parallel with one another on the upper clad layer 21 are sealed by the lower clad layer 22 and the upper clad layer 21. It is noted that the second optical waveguide layer 5 forms the discrete optical waveguides 5a to 5f spaced at intervals that ensure that the optical signals may be transmitted through these discrete optical waveguides independently without interfering with each other.

The second optical waveguide layer 5 has, on the surface of the intermediate layer 6, the upper clad layer 21 formed with the resin material coated in a uniform thickness. The second optical waveguide layer 5 also has the core 20 formed by predetermined patterning to a resin layer deposited on the upper clad layer 21 by coating with the resin material that is to form the core 20. The second optical waveguide layer 5 also has the lower clad layer 22 formed with the resin material coated over the whole surface of the upper clad layer 21 so as to cover the core 20.

The second optical waveguide layer 5 also has the second electrode layer 10 including a photoconductive electrode material such as ITO, for instance, so as to cover a portion situated on the gap section 7 of the upper clad layer 21. The second electrode layer 10 is formed by predetermined patterning by means of etching to an electrode material layer deposited on a predetermined area of the upper clad layer 21.

The second optical waveguide layer 5 also has the second short-circuit proof layer 11 throughout an area of the gap section 7 so as to cover the second electrode layer 10 situated on the gap section 7. The second short-circuit proof layer 11 is effective in preventing an excessive flow of current from being caused by the direct contact of the first electrode layer 8 with the second electrode layer 10, when the second optical waveguide layer 5 is driven as described above. The second short-circuit proof layer 11 is also formed by predetermined patterning by means of etching, etc. to an insulating layer deposited with a photoconductive insulating material such as silicon oxide and silicon nitride, for instance. A photoconductive insulating material having refractive index substantially equal or lower than that of the clad material is also preferably used for the second short-circuit proof layer 11 to have no effect on the propagation mode of the optical signal transmitted through the second optical waveguide layer 5.

It is noted that the optional waveguide switch 1 forms not only the first short-circuit proof layer 9 formed at the first optical waveguide layer 4-side but also the second short-circuit proof layer 11 formed at the second optical waveguide layer 5-side to prevent the direct contact of the first electrode layer 8 with the second electrode layer 10 at the time of operation. As a matter of course, the optical waveguide switch 1 may have, on either of the first optical waveguide layer 4 or the second optical waveguide layer 5, the short-circuit proof layer that prevents the direct contact of the first electrode layer 8 with the second electrode layer 10.

In the optical waveguide switch 1, the first electrode layer 8 and the second electrode layer 10 are respectively connected to the first connection terminal 14 and the second connection terminal 15 respectively mounted on the lower clad layer 22 of the second optical waveguide layer 5. Thus, drive voltage is applied to the first electrode layer 8 and the second electrode layer 10 through the first connection terminal 14 and the second connection terminal 15. The first electrode layer 8 is electrically connected to the first connection terminal 14 through the first via hole 12 that is opened through the lower clad layer 18 and the upper clad layer 19 of the first optical waveguide layer 4, the intermediate layer 6 and the upper clad layer 21 and the lower clad layer 22 of the second optical waveguide layer 5. The second electrode layer 10 is electrically connected to the second connection terminal 15 through the second via hole 13 that is opened through the upper clad layer 21 and the lower clad layer 22 of the second optical waveguide layer 5.

The optical waveguide switch 1 having the above configuration is directly formed in the optical bus 3 composed of the first optical waveguide layer 4 and the second optical waveguide layer 5 and carries out the optical switching operation by making the second optical waveguide layer 5 be mechanically moved into and out of contact with the first optical waveguide layer 4. In a non-operating condition as shown in FIG. 4, the optical waveguide switch 1 ensures that the first optical waveguide layer 4 and the second optical waveguide layer 5 keep a predetermined layer-to-layer spacing through the intermediate layer 6. The optical waveguide switch 1 makes an optical signal S11 and an optical signal S12 be transmitted through the first optical waveguide layer 4 and the second optical waveguide layer 5 in propagation modes that are not coupled with each other by the proximity effect perturbation. It is noted that the optical signal S11 and the optical signal S12 are transmitted in propagation modes whose propagation constants are respectively $\beta 1$ and $\beta 2$.

In the optical waveguide switch 1, the drive voltage is applied to the first electrode layer 8 and the second electrode layer 10 through the first connection terminal 14 and the second connection terminal 15. The optical waveguide switch 1 makes the second optical waveguide layer 5 be moved toward the first optical waveguide layer 4 within the gap section 7 as shown in FIG. 5 by an electrostatic force generated between the first electrode layer 8 and the second electrode layer 10. It is noted that the optical waveguide switch 1 forms the first short-circuit proof layer 9 and the second short-circuit proof layer 11 respectively on the first optical waveguide layer 4 and the second optical waveguide layer 5 as described above to prevent the excessive flow of current from being caused by the direct contact of the first electrode layer 8 with the second electrode layer 10.

With a movement of the second optical waveguide layer 5, the optical waveguide switch 1 enters a condition in which the optical signal S12 transmitted through the second optical waveguide layer 5 and the optical signal S11 transmitted through the first optical waveguide layer 4 cause the propagation modes to be coupled with each other by the proximity effect perturbation. The optical waveguide switch 1 makes the optical signal S11 and the optical signal S12 excite an even symmetrical mode and an odd symmetrical mode, so that the propagation constants of the propagation modes are changed from $\beta 1$ to $\beta 0$ and $\beta 2$ to $\beta e$, as shown in FIG. 5. In a coupling area of the first optical waveguide layer 4 with the second optical waveguide layer 5, the optical waveguide switch 1 ensures that a phase difference of $(\beta e - \beta 0)z$ between the two propagation modes is created in proportion to the propagation of the optical signals S11 and S12.

The optical waveguide switch 1 is designed such that a length L in a transmission direction of the coupling area of the first optical waveguide layer 4 with the second optical waveguide layer 5 is similar to a propagation distance of $\pi/(\beta e - \beta 0)$ where the phase difference between the optical signals S11 and S12 is $\pi$. Thus, the optical waveguide switch 1 makes the optical signal S11 transmitted through the first optical waveguide layer 4 o be transferred to the second optical waveguide layer 5 through the coupling area for further transmission. Likewise, the optical waveguide switch 1 also makes the optical signal S12 transmitted through the second optical waveguide layer 5 be transferred to the first optical waveguide layer 4 through the coupling area for further transmission. Thus, the optical waveguide switch 1 forms a two-to-two optical switch that is effective in simultaneously switching, between the first optical waveguide layer 4 and the second optical waveguide layer 5 that are in the vertical layered arrangement, the optical signals transmitted through the plurality of discrete optical waveguides respectively formed in the first optical waveguide layer 4 and the second optical waveguide layer 5.

An optical waveguide switch 25 shown in FIG. 6 to FIG. 9 as another preferred embodiment of the present invention has a configuration in which a substrate 26 has thereon first to third optical waveguide layers 29 to 31 that are in a three-layered arrangement through a first intermediate layer 27 and a second intermediate layer 28, while the intermediate layers 27, 28 respectively have a first gap section 32 and a second gap section 33 to form the second optical wave guide layer 30 as of movable type. The optical waveguide switch 25 forms the substrate 26, the first to third optical waveguide layers 29 to 31, the intermediate layers 27, 28 and the gap sections 32, 33 that are similar in structure and operation to the first optical waveguide layer 4, the second optical waveguide layer 5, the intermediate layer 6 and the gap section 7 of the above optical waveguide switch 1.

Figure 6:
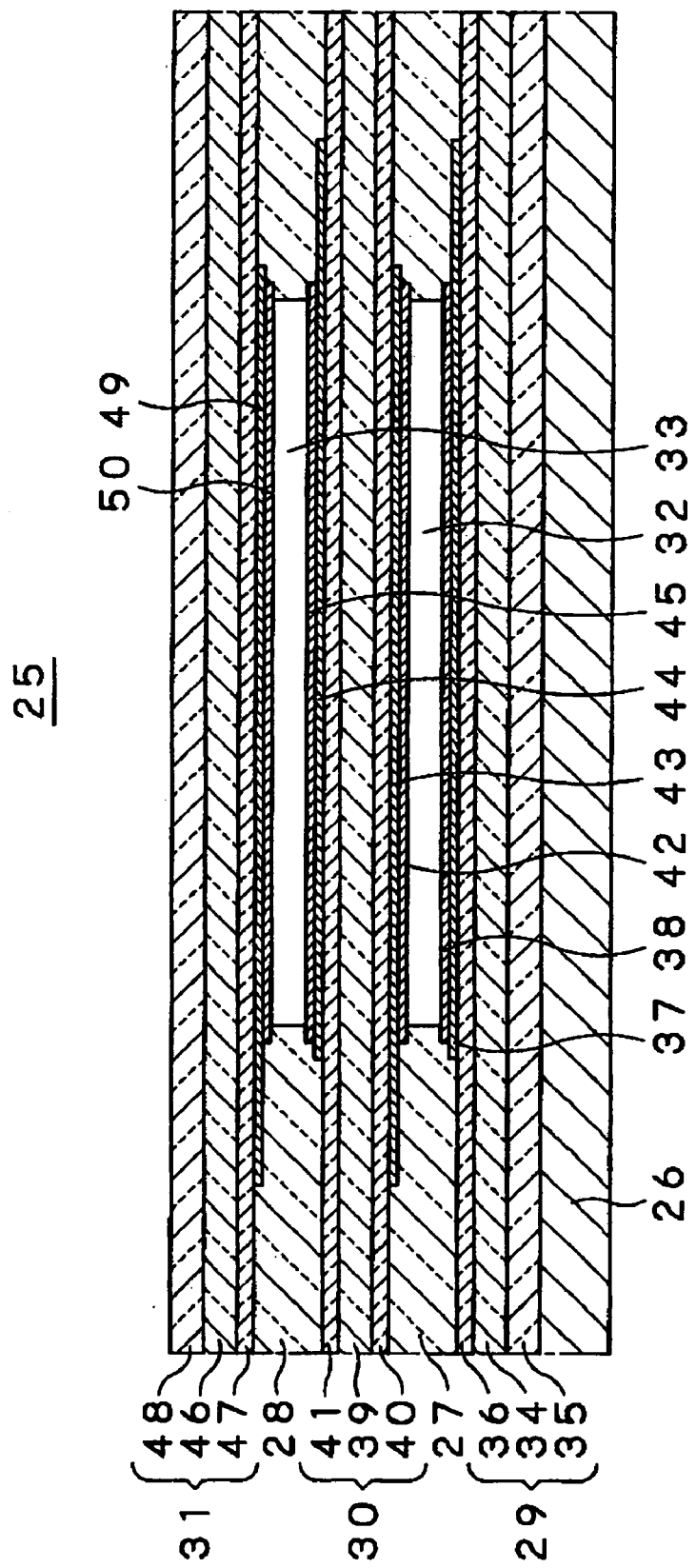
FIG. 6 is a longitudinal cross-sectional view of a three-layered optical waveguide switch according to a preferred embodiment of the present invention.
Figure 7:
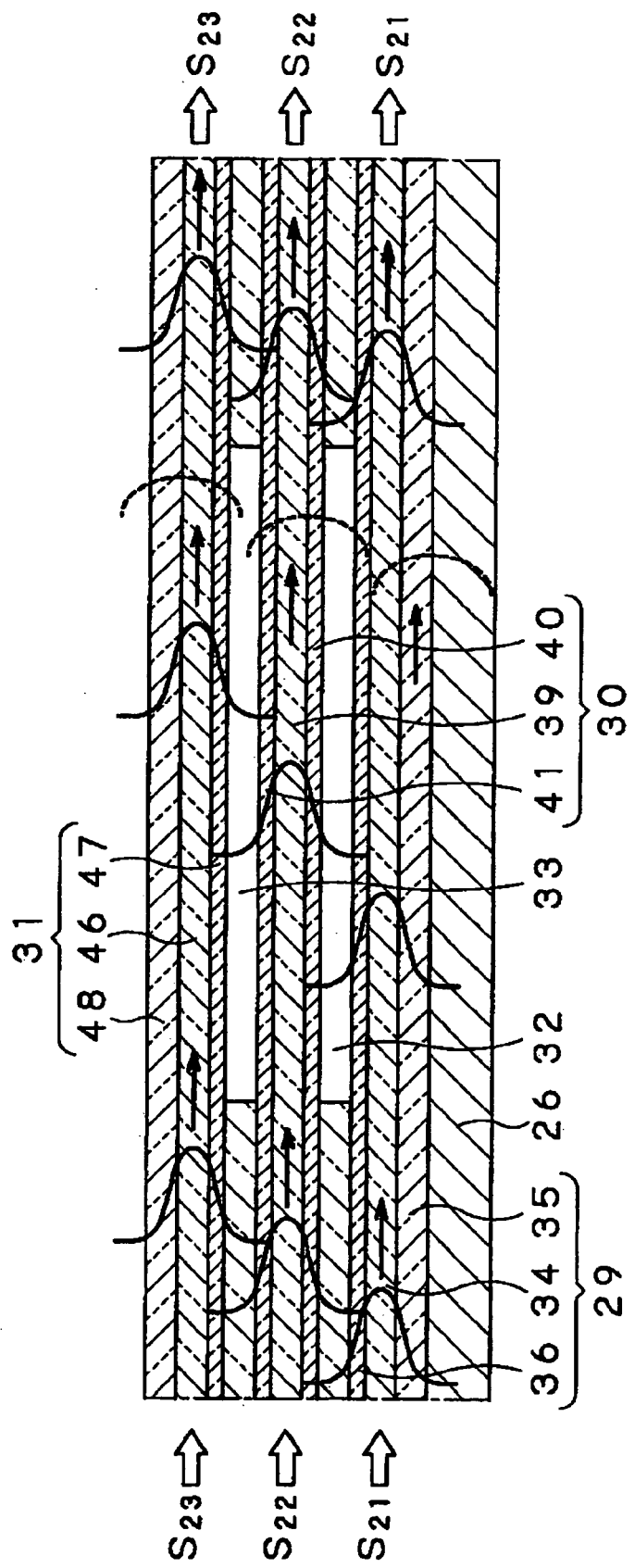
FIG. 7 illustrates a switching operation of the three-layered optical waveguide switch, more specifically, a non-switching operation condition according to a preferred embodiment of the present invention.

As shown in FIG. 6, the optical waveguide switch 25 has the first optical waveguide layer 29 configured with a core 34 sealed by a lower clad layer 35 and an upper clad layer 36. The first optical waveguide layer 29 has thereon a first electrode layer 37 and a first short-circuit proof layer 38 that are situated on the first gap section 32. The first optical waveguide layer 29 is composed of a plurality of discrete optical waveguides that are in parallel with one another within the same layer. The first optical waveguide layer 29 forms the discrete optical waveguides spaced at intervals that ensure that optical signals may be transmitted through these discrete optical waveguides independently without interfering each other.

As shown in FIG. 6, the optical waveguide switch 25 also has the second optical waveguide layer 30 configured with a core 39 sealed by a lower clad layer 40 and an upper clad layer 41. The second optical waveguide layer 30 has, on the lower clad layer 40 facing the first optical waveguide layer 29 through the first gap section 32, a second electrode layer 42 and a second short-circuit proof layer 43. The second optical waveguide layer 30 also has, on the upper clad layer 41, a third electrode layer 44 and a third short-circuit proof layer 45 respectively facing the second electrode layer 42 and the second short-circuit proof layer 43 through the core 39. The third electrode layer 44 and the third short-circuit proof layer 45 are situated on the second gap section 33. It is noted that the second optical waveguide layer 30 is also composed of a plurality of discrete optical waveguides respectively facing the discrete optical waveguides of the first optical waveguide layer 29.

As shown in FIG. 6, the optical waveguide switch 25 also has the third optical waveguide layer 31 configured with a core 46 sealed by a lower clad layer 47 and an upper clad layer 48. The third optical waveguide layer 31 has, on the lower clad layer 47 facing the second optical waveguide layer 30 through the second gap section 33, a fourth electrode layer 49 and a fourth short-circuit proof layer 50. The third optical waveguide layer 31 is also composed of a plurality of discrete optical waveguides respectively facing the discrete optical waveguides of the first optical waveguide layer 29 and those of the second optical waveguide layer 30.

With the above configuration, the optical waveguide switch 25 ensures that the second optical waveguide layer 30 is supported in an intra-layer suspended condition within a predetermined area in a transmission direction through the first gap section 32 and the second gap section 33. In the optical waveguide switch 25, the above electrode layers 37, 42, 44 and 49 are respectively connected to connection terminals mounted on the upper clad layer 48 of the third optical waveguide layer 31 through interlayer via hole (not shown).

The optical waveguide switch 25 having the above configuration carries out an optical switching operation by making the second optical waveguide layer 30 to be selectively moved into and out of contact with the first optical waveguide layer 29 or the third optical waveguide layer 31. In a non-operating condition shown in FIG. 7, the optical waveguide switch 25 ensures that the first to third optical waveguide layers 29 to 31 keep a predetermined layer-to-layer spacing through the intermediate layers 27, 28. The optical wave guide switch 25 makes optical signals S21 to S23 be transmitted through the first to third optical waveguide layers 29 to 31 in propagation modes that are not coupled with each other by the proximity effect perturbation.

Figure 8:
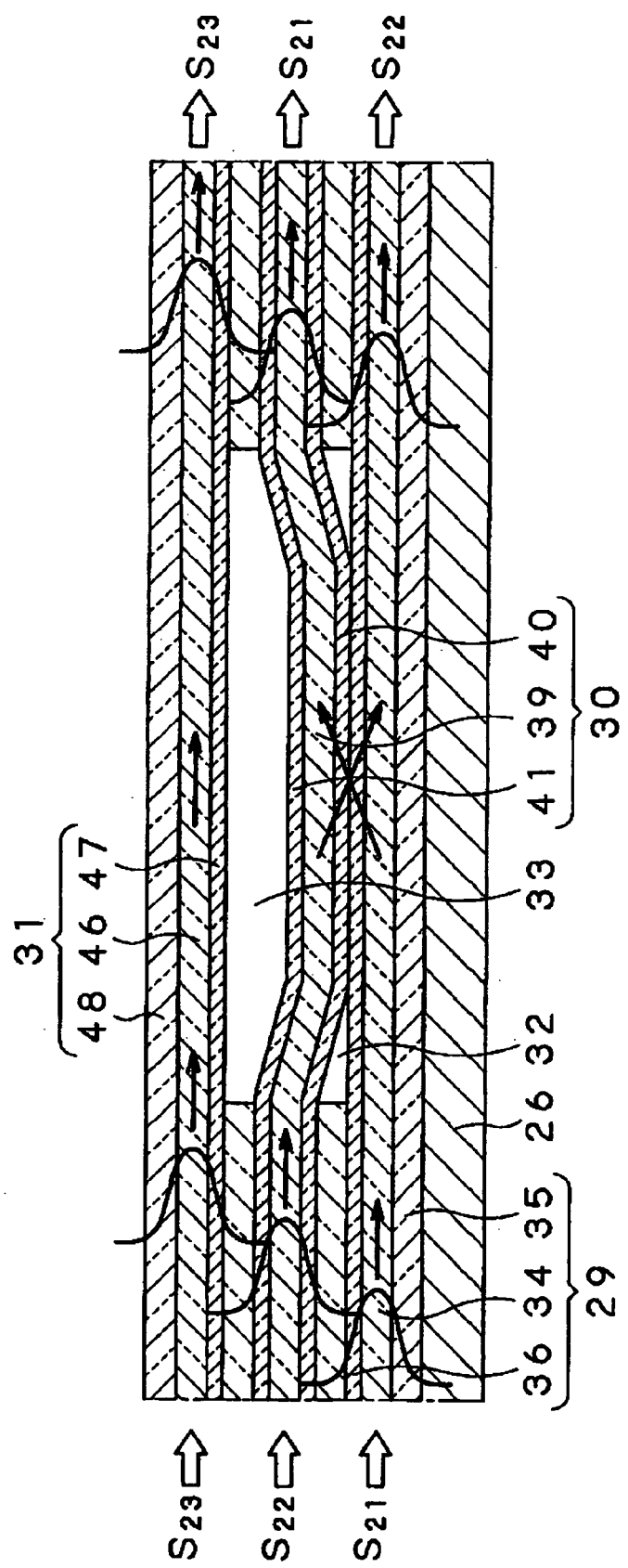
FIG. 8 illustrates a switching operation of the three-layered optical waveguide switch, more specifically, a first optical waveguide-to-second optical waveguide switching operation condition according to a preferred embodiment of the present invention.

In the optical waveguide switch 25, drive voltage is applied to the first electrode layer 37 of the first optical waveguide layer 29 and the second electrode layer 42 of the second optical waveguide layer 30, for instance. In the optical waveguide switch 1, an electrostatic force is generated between the first electrode layer 37 and the second electrode layer 42 with the application of the drive voltage as described above to move the second optical waveguide layer 30 toward the first optical waveguide layer 29 within the first gap section 32 as shown in FIG. 8, so that an optical switching takes place between the first optical waveguide layer 29 and the second optical waveguide layer 30.

With the movement of the second optical waveguide layer 30, the optical waveguide switch 25 enters a condition in which the optical signal S22 transmitted through the second optical waveguide layer 30 and the optical signal S21 transmitted through the first optical waveguide layer 29 cause the propagation modes to be coupled with each other by the proximity effect perturbation. The optical waveguide switch 25 makes the optical signal S21 transmitted through the first optical waveguide layer 29 as shown in FIG. 8 be transferred to the second optical waveguide layer 30 through the coupling area for further transmission. Likewise, the optical waveguide switch 25 also makes the optical signal S22 transmitted through the second optical waveguide layer 30 be transferred to the first optical waveguide layer 29 through the coupling area for further transmission. It is noted that the optical waveguide switch 25 ensures that the second optical waveguide layer 30 and the third optical waveguide layer 31 keep a predetermined layer-to-layer spacing, more specifically, a condition in which the optical signals S22 and S23 respectively transmitted through the second optical waveguide layer 30 and the third optical waveguide layer 31 do not cause the propagation modes to be coupled with each other.

Figure 9:
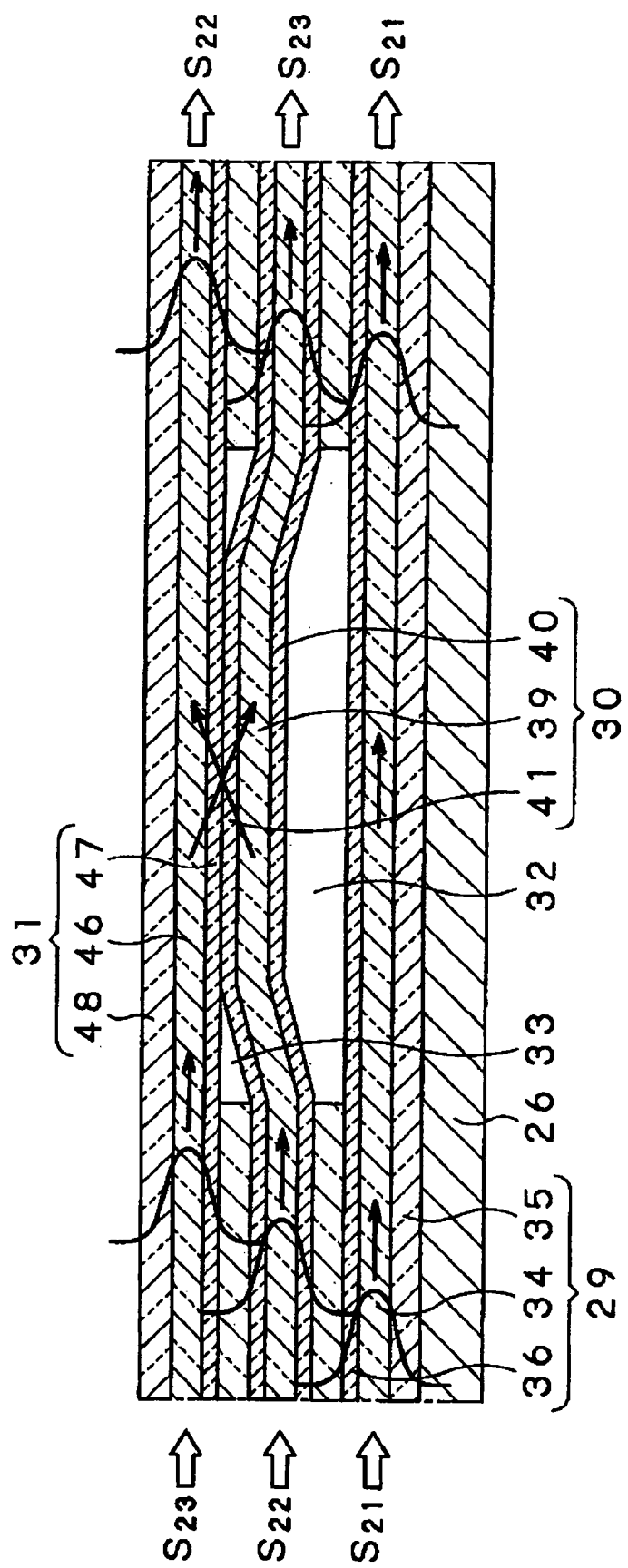
FIG. 9 illustrates a switching operation of the three-layered optical waveguide switch, more specifically, a second optical waveguide-to-third optical waveguide switching operation condition, according to a preferred embodiment of the present invention.

In the optical waveguide switch 25, drive voltage is also applied to the third electrode layer 44 of the second optical waveguide layer 29 and the fourth electrode layer 49 of the third optical waveguide layer 31, for instance. In the optical waveguide switch 25, an electrostatic force is generated between the third electrode layer 44 and the fourth electrode layer 49 with the application of the drive voltage as described above to move the second optical waveguide layer 30 toward the third optical waveguide layer 31 within the second gap section 33 as shown in FIG. 9, so that an optical switching takes place between the second optical wave guide layer 30 and the third optical waveguide layer 31.

With the movement of the second optical waveguide layer 30, the optical waveguide switch 25 enters a condition in which the optical signal S22 transmitted through the second optical waveguide layer 30 and the optical signal S23 transmitted through the third optical waveguide layer 31 cause the propagation modes to be coupled with each other by the proximity effect perturbation. As shown in FIG. 9, the optical waveguide switch 25 makes the optical signal S22 transmitted through the second optical waveguide layer 30 be transferred to the third optical waveguide layer 31 through the coupling area for further transmission. Likewise, the optical waveguide switch 25 also makes the optical signal S23 transmitted through the third optical waveguide layer 31 be transferred to the second optical waveguide layer 80 through the coupling area for further transmission. It is noted that the optical waveguide switch 25 ensures that the first optical waveguide layer 29 and the second optical waveguide layer 30 keep a predetermined layer-to-layer spacing, more specifically, a condition in which the optical signals S21 and S22 respectively transmitted through the first optical waveguide layer 29 and the second optical waveguide layer 30 do not cause the propagation modes to be coupled with each other.

In the optical waveguide switch 25 having the above configuration, the second optical waveguide layer 30 forms a transfer-type optical waveguide that is selectively moved into and out of contact with the first optical waveguide layer 29 or the third optical waveguide layer 31 to transfer the optical signals between the second optical waveguide layer 30 and the first optical waveguide layer 29 or the third optical waveguide layer 31 for further transmission. Thus, the optical waveguide switch 25 forms a three-to-three optical switch that is effective in simultaneously switching, between the vertically adjacent layers, the optical signals transmitted through the plurality of discrete optical waveguides.

Figure 10:
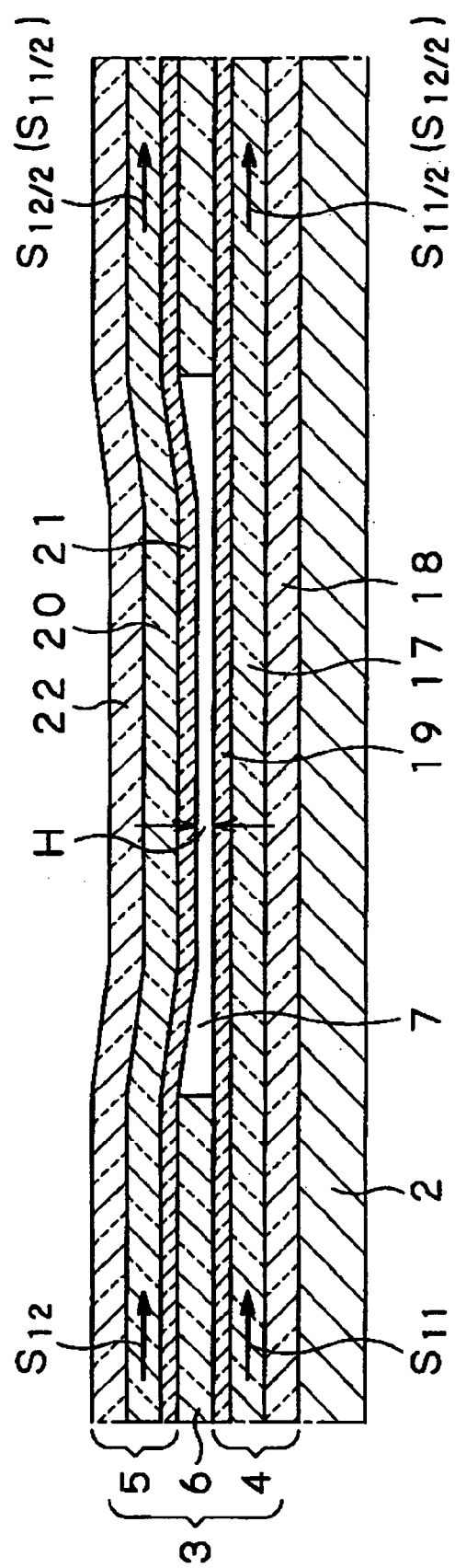
FIG. 10 is a longitudinal cross-sectional view of an optical waveguide switch according to a preferred embodiment of the present invention.

An optical waveguide switch 55 shown in FIG. 10 as another preferred embodiment of the present invention is similar in its basic configuration with the above optical waveguide switch 1, with the exception of the following aspect. That is, the optical waveguide switch 55 is characterized by a configuration in which a shift position of the second optical waveguide layer 5 to the first optical waveguide layer 4 is controlled. The optical waveguide switch 55 forms the components that are similar in structure with those of the optical waveguide switch 1, so that the same reference numerals are given to the corresponding sections to avoid a redundant description thereof.

The optical waveguide switch 55 also makes the second optical waveguide layer 5 be moved toward the first optical waveguide layer 4 within the gap section 7 with a drive voltage applied to the first electrode layer 8 and the second electrode layer 10 (not shown). In this case, the optical waveguide switch 55 ensures that a voltage control, for instance, makes the second optical waveguide layer 5 be selectively driven between a first position where the second optical waveguide layer 5 directly makes contact with the first optical waveguide layer 4 and a second position where the second optical waveguide layer 5 is held at a height of H within the gap section 7. It is noted that the optical waveguide switch 55 is configured so that the first optical waveguide layer 4 and the second optical waveguide layer 5 are practically in contact with each other at the first position through the short-circuit proof layers 9, 11 without making the direct contact.

The optical waveguide switch 55 carries out switching, of the optical signal S11 transmitted through the first optical waveguide layer 4 or the optical signal S22 transmitted through the second optical waveguide layer 5 as described above by making the second optical waveguide layer 5 be moved to the first position. With the second optical waveguide layer 5 held at the second position as shown in FIG. 10, the optical waveguide switch 55 ensures that the first optical waveguide layer 4 and the second optical waveguide layer 5 are in an incomplete coupled condition. The optical waveguide switch 55 thereby makes the optical signal S11 transmitted through the first optical waveguide layer 4 or the optical signal S22 transmitted through the second optical waveguide layer 5 be transmitted, for example, by dividing optical power.

Figure 11:
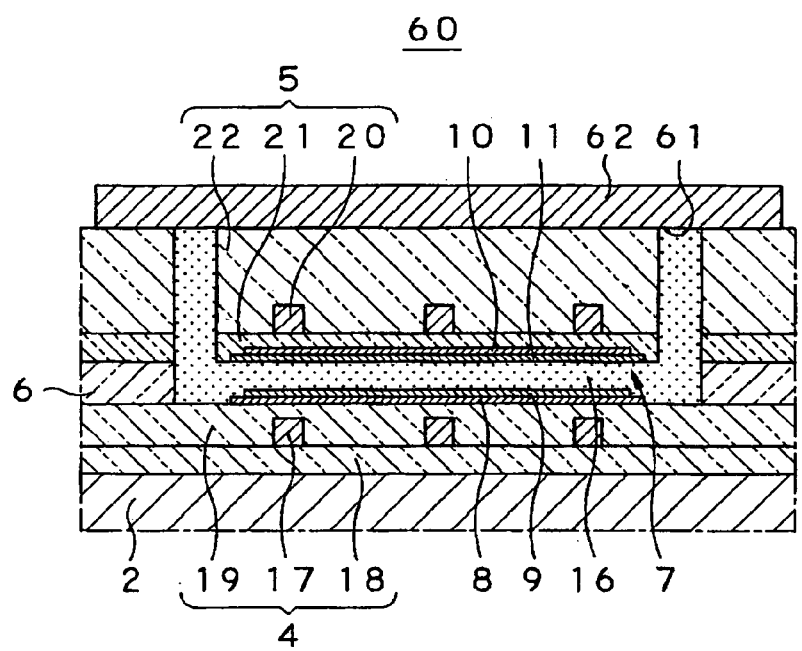
FIG. 11 is a longitudinal cross-sectional view of an optical waveguide switch, according to a preferred embodiment of the present invention.

An optical waveguide switch 60 shown in FIG. 11 as another preferred embodiment of the present invention is similar in basic configuration with the above optical waveguide switch 1, with the exception of the following point. That is, the optical waveguide switch 60 is characterized by a sealing structure adapted to sealing of the liquid 16 filled in the gap section 7. The optical waveguide switch 60 has the components that are similar in structure to those of the optical waveguide switch 1, so that the same reference numerals are given to corresponding sections to avoid a redundant description thereof.

The optical waveguide switch 60 forms the gap section 7 filled with the liquid 16 such as appropriate oils whose refractive index is substantially equal to that of the short-circuit proof layers 9, 10, instead of air, to attain the above stabled optical switching operation. Thus, the optical waveguide switch 60 has, in the second optical waveguide layer 5, an opening 61 communicating with the gap section 7 without damaging an optical signal transmission function. The liquid 16 is injected into the gap section 7 through the opening 61. In the optical waveguide switch 60, the opening 61 is sealed by a sealing cap with air excluded by the liquid 16 filled in the gap section 7.

Figure 12:
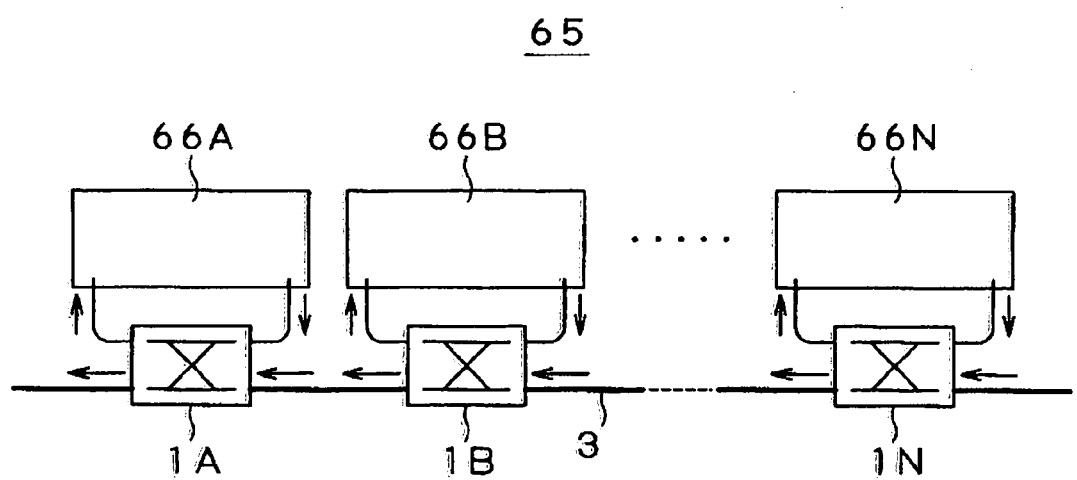
FIG. 12 is a schematic diagram showing a configuration of an optical signal transmission system using the optical waveguide switch, according to a preferred embodiment of the present invention.

The optical waveguide switch 1 is directly formed at a predetermined portion of the optical bus 3 as described above and carries out the optical switching of the optical signals S11 and S12 respectively transmitted through the first optical waveguide layer 4 and the second optical waveguide layer 5. The optical waveguide switch 1 is applicable to an optical signal transmission system 65 configured with a large number of end nodes 66A to 66N interconnected through the optical bus 3 as shown in FIG. 12, for instance.

Optical waveguide switches 1A to 1N are respectively interposed between the end nodes 66A to 66N and the optical bus 3 adapted to transmission of the plurality of optical signals and carries out switching between the end nodes 66A to 66N and the optical bus 3. The optical waveguide switches 1A to 1N are selectively operated in response to a control signal transmitted through the optical bus 3 to ensure that transfer of the optical signals takes place between the end nodes 66A and 66B, for instance. The optical waveguide switch 1 enables building of the optical signal transmission system 65 or the like, effective in transferring the optical signals among the end nodes 66A to 66N using the shared optical bus 3 as described above to be attained.

The optical signal transmission system 65 forms the end nodes 66A to 66N respectively composed of various integrated circuit elements packaged on the substrate, and may ensure that a hybrid module adaptable to inter-integrated circuit element transmission of the information signals or the like with the optical signals is configured. The optical signal transmission system 65 may form a hybrid module which attains increased speed and/or increased capacity of signal transmission with a reduction in parasitic capacitance attributable to the electrical interconnects.

A method for manufacturing the above optical waveguide switch 1 is described in the following with reference to FIGS. 13 to 26. A fabrication process of the optical waveguide switch 1 includes a first optical waveguide layer forming step of forming the first optical waveguide layer 4 on the surface 2a of the supplied substrate 2, a first electrode layer forming step of forming the first electrode layer 8 on the first optical waveguide layer 4 and a first short-circuit proof layer forming step of forming the first short-circuit proof layer 9. The fabrication process of the optical waveguide switch 1 further includes an intermediate layer forming step of forming the intermediate layer 6 on the first optical waveguide layer 4, a gap section forming step of forming the gap section 7, a fill-up material filling step of forming a buried layer 70 by filling the gap section with a fill-up material, and a polishing step of polishing the intermediate layer 8 and the buried layer 70.

The fabrication process of the optical waveguide switch 1 further includes a second short-circuit proof layer forming step of forming the second short-circuit proof layer 11 on the second optical waveguide layer 5, and a second electrode layer forming step of forming the second electrode layer 10. The fabrication process of the optical waveguide switch 1 further includes a second optical waveguide layer forming step of forming the second optical waveguide layer 5 on the intermediate layer 6, and a gap section forming step of forming the gap section 7 in a portion of the intermediate layer 6 by removing the buried layer 70. The fabrication process of the optical waveguide switch 1 further includes a liquid filling step of filling the gap section 7 with the liquid 16, and a sealing step of sealing up the opening 61 with a sealing cap 62. The fabrication process of the optical waveguide switch 1 further includes a via hole forming step of forming the first via hole 12 and the second via hole 13 that are opened through the first optical waveguide layer 4 and the second optical waveguide layer 5.

Figure 13A:
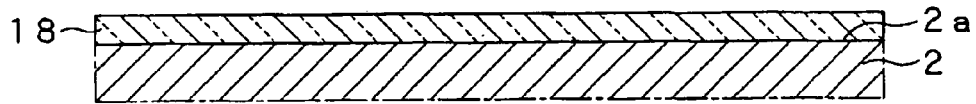
FIGS. 13(A) and 13(B) illustrate longitudinal cross-sectional views of a process of forming of the optical waveguide switch, more specifically, a step of forming a lower clad layer of a first optical waveguide layer on a substrate, according to a preferred embodiment of the present invention.
Figure 13B:

In the fabrication process of the optical waveguide switch 1, the first optical waveguide layer forming step includes a step of forming the lower clad layer 18, a step of forming the core 17 and a step of forming the upper clad layer 19. The forming process starts with supply of the substrate 2 such as the silicon substrate and the glass substrate, for instance, that may form the relatively accurate flat face, as shown in FIG. 13. Then, the forming process forms, on the surface 2a of the substrate 2, the lower clad layer 18 that is to form the first optical waveguide layer 4. The lower clad layer 18 is formed with an appropriate photoconductive resin material, more specifically, a resin material such as polyimide resin, epoxy resin, acrylic resin, polyolefin resin and rubber resin. The lower clad layer 18 is formed by hardening a liquid resin material after coating thereof using a coating method such as spin coating that is effective in forming a uniform thickness layer, for instance.

Figure 14A:
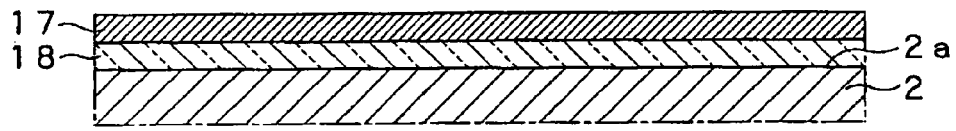
FIGS. 14(A) and 14(B) illustrate longitudinal cross-sectional views of, a step of forming a core on the lower clad layer, according to a preferred embodiment of the present invention.
Figure 14B:
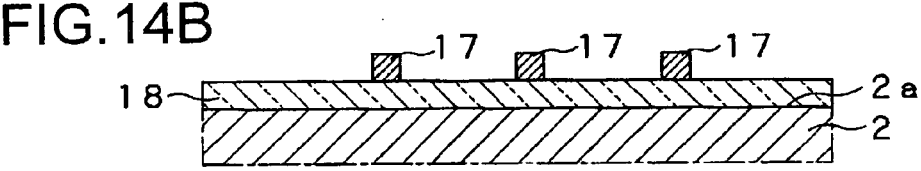

The forming process then forms, on the lower clad layer 18, the core 17 that is to form the plurality of discrete optical waveguides, as shown in FIG. 14. The core 17 employs a photoconductive photosensitive resin material whose refractive index is higher than that of the resin material for the lower clad layer 18, and is formed by patterning of each discrete optical waveguide, with a spacing kept not to make the discrete optical waveguides optically interfere each other, to a core resin material layer deposited on the lower clad layer 18 with the resin material coated in a predetermined thickness, for instance. It is noted that when the photosensitive resin material is used for the core 17, the core 17 is formed by means of dry etching or the like. As a matter of course, the core 17 may be also formed by other methods such as direct bonding of the core material to the lower clad layer 18 and filling of the resin material in patterned trenches directly formed on the lower clad layer 18.

Figure 15A:
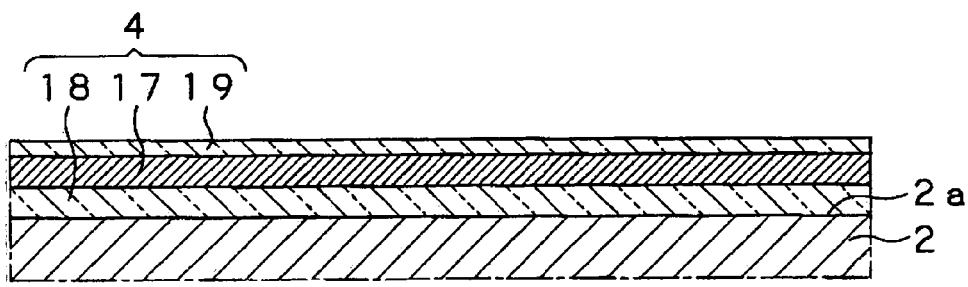
FIGS. 15(A) and 15(B) illustrate longitudinal cross-sectional views of a step of forming, on the lower clad layer, an upper clad layer that is to seal the core, according to a preferred embodiment of the present invention.
Figure 15B:
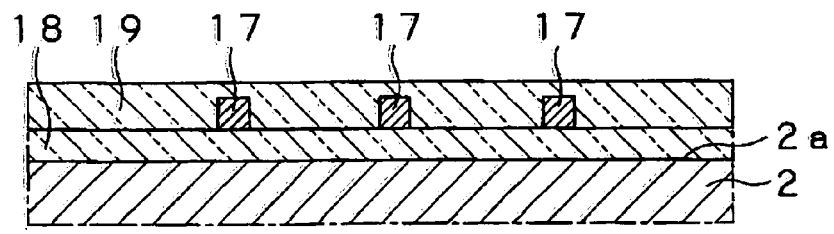

The fabrication process then forms, on the lower clad layer 18, the upper clad layer 19 with the core 17 sealed up, as shown in FIG. 15. The upper clad layer 19 employs a resin material whose refractive index is lower than that of the core 17, more specifically, a liquid resin material whose photo-conductivity is the same as that of the lower clad layer 18, and is formed by hardening the above resin material after coating thereof on the surface of the lower clad layer 18 in a thickness sufficient to completely cover the core 17 using a coating method such as spin coating that is effective in forming a uniform thickness layer. With the above steps, the forming process forms, on the surface 2a of the substrate 2, the first optical waveguide layer 4 configured with the core 17 sealed by the lower clad layer 18 and the upper clad layer 19.

Figure 16A:
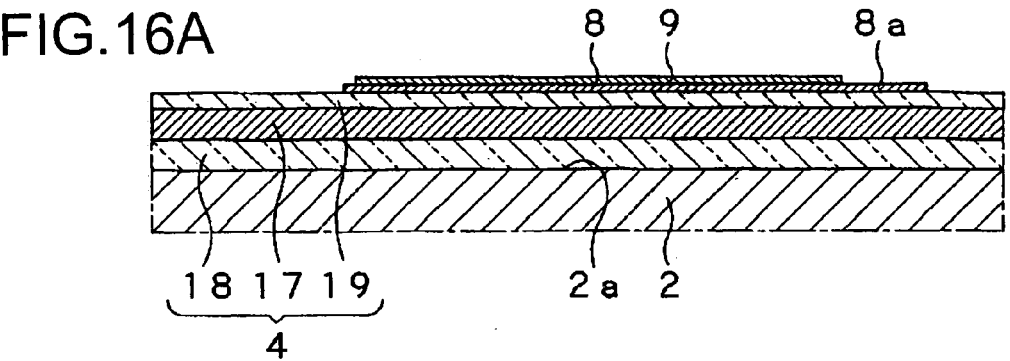
FIGS. 16A) and 16(B) illustrate longitudinal cross-sectional views of a step of forming a first electrode layer and a first short-circuit proof layer on the upper clad layer, according to a preferred embodiment of the present invention.
Figure 16B:
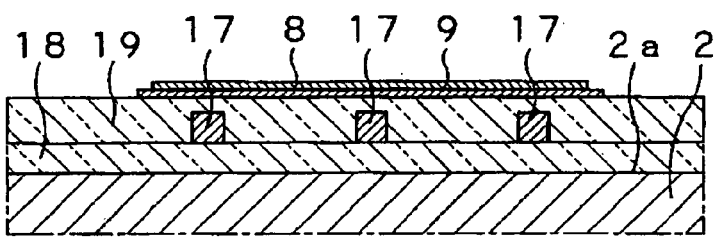

The forming process then forms, on the first optical waveguide layer 4 obtained through the above steps, the first electrode layer 8 with the ITO available as a transparent conductive film material, for instance, as shown in FIG. 16. The first electrode layer 8 is formed by patterning in a predetermined length in an optical signal transmission direction, more specifically, a length slightly larger than the length L of the above coupling area by means of wet etching with hydrochloric acid or the like to an ITO film deposited on a predetermined area of the upper clad layer 19.

The forming process then forms, on the first electrode layer 8, the first short-circuit proof layer 9 including a transparent insulating layer with a photoconductive transparent insulating material such as $SiO_2$ and SiN, as shown in FIG. 16. The first short-circuit proof layer 9 is formed by patterning in a predetermined length in the optical signal transmission direction, more specifically, a length slightly larger than the length L of the above coupling section and also slightly smaller than that of the first electrode layer 8 by means of wet etching with dilute hydrofluoric acid or the like to the transparent insulating layer. As shown in FIG. 16, the first short-circuit proof layer 9 makes the connection terminal section of the first via hole 12 be formed by a largely projecting one end side 8a of the first electrode layer 8, as will be described later.

Figure 17A:
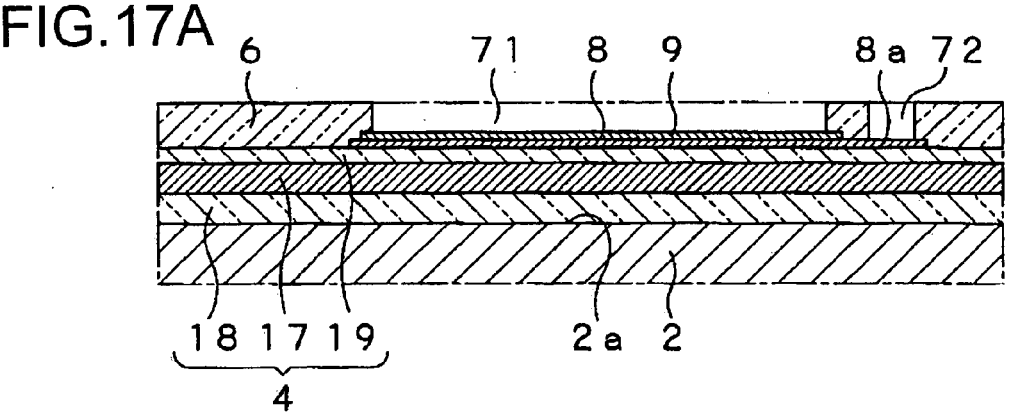
FIGS. 17(A) and 17(B) illustrate longitudinal cross-sectional views of a step of forming an intermediate layer, a gap section and a first via hole on the upper clad layer, according to a preferred embodiment of the present invention.
Figure 17B:
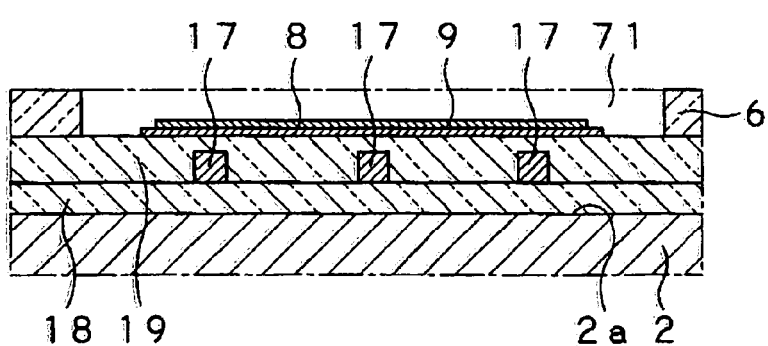

The fabrication process then forms the intermediate layer 6 so as to cover the first optical waveguide layer 4, the first electrode layer 8 and the first short-circuit proof layer 9, as shown in FIG. 17. The intermediate layer 6 employs a liquid resin material whose photoconductivity is similar to that of the first optical waveguide layer 4, more specifically, the liquid resin material whose refractive index is equal or lower than the resin material thereof, and is formed by hardening the resin material after coating thereof on the surface of the first optical waveguide layer 4 and the like using a coating method such as spin coating that is effective in forming a uniform thickness layer. Alternatively, the same material as that for the first optical waveguide layer 4, for instance, may be also used for the intermediate layer 6.

The intermediate layer 6 has a thickness that ensures that the optical signals S11 and S12 transmitted through the first optical waveguide layer 4 and the second optical waveguide layer 5 are transmitted through these optical waveguide layers without allowing the proximity effect perturbation to occur, as described above. The opening 71 that is to form the gap section 7 with the first electrode layer 8 and the first short-circuit proof layer 9 exposed to the outside is formed by patterning by means of etching or the like to the intermediate layer 6. In addition, a first via hole 72 that is to form the first via hole 12 with the projecting one end side 8a of the first electrode layer 8 to the outside is also formed by patterning by means of etching or the like to the intermediate layer 6. Alternatively, the intermediate layer 6 may also form the opening 71 and the first via hole 72 by other appropriate methods such as laser machining, for instance. In addition to a de-smearing treatment, an intra-hole conduction treatment with electroless copper plating or the like, for instance, is also applied to the first via hole 72.

Figure 18A:
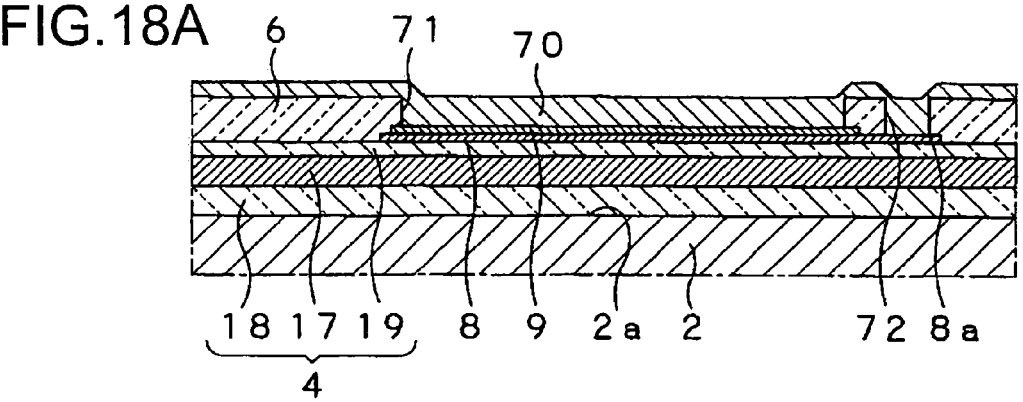
FIGS. 18(A) and 18(B) illustrate longitudinal cross-sectional views of a step of forming a copper layer to fill up the gap section and the first via hole, according to a preferred embodiment of the present invention.
Figure 18B:
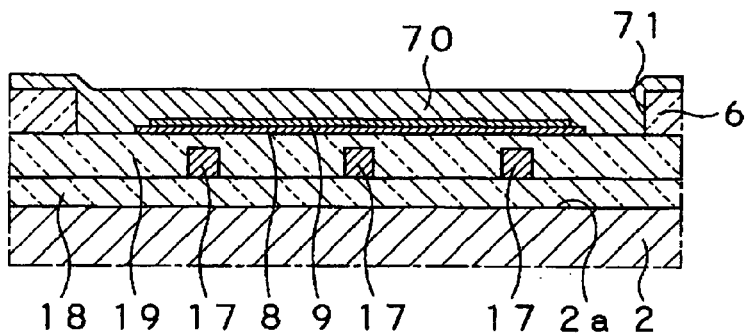

The fabrication process then forms the buried layer 70 by filling a conductive fill-up material in the opening 71 and the first via hole 72 that are opened in the intermediate layer 6, as shown in FIG. 18. The buried layer 70 consists of a Cu layer formed by electroless copper plating, for instance and is deposited in a thickness larger than a depth of the opening 71 or the first via hole 72 so as to cover the whole surface of the intermediate layer 6. The buried layer 70 is formed in a stepped form so as to have a difference in level between portions corresponding to the opening 71 and the first via hole 72 and a surface portion of the intermediate layer 6. Alternatively, the buried layer 70 may be one formed by filling the conductive fill-up material after the intra-hole conduction treatment using a metal film deposition technology such as plating, sputtering and chemical vapor deposition (CVD), for instance.

Figure 19A:
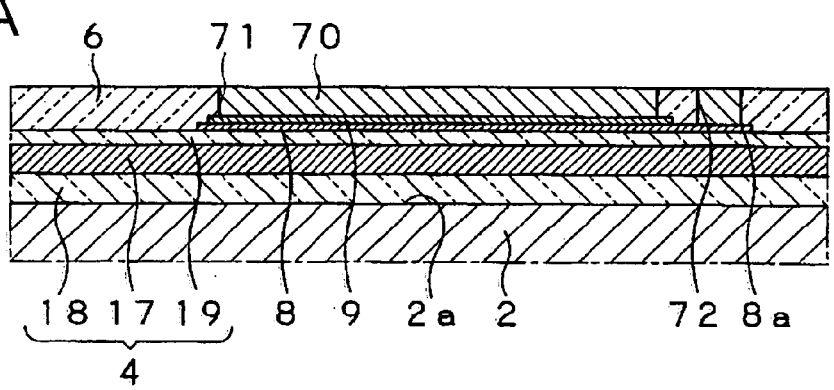
FIGS. 19(A) and 19(B) illustrate longitudinal cross-sectional views of a step of carrying out polishing of the copper layer, according to a preferred embodiment of the present invention.
Figure 19B:
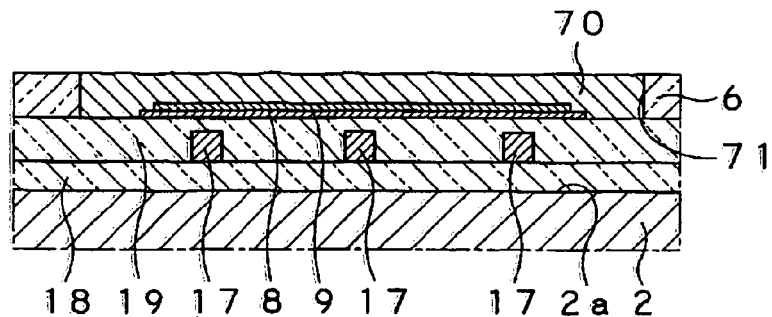

Thus, the forming process involves the polishing step of polishing a surface of an intermediate structure between the first and second optical waveguide layers into planarization as shown in FIG. 19 in order to form the accurate second optical waveguide layer 5 in the later second optical waveguide layer forming step. The polishing step employs chemical-mechanical polishing (CMP) or the like that is effective in selectively polishing the Cu layer, for instance, because of a need for simultaneous polishing of the intermediate layer 6 including the resin material and the buried layer 70 including the metal film into planarization. The polishing step is to polish the intermediate layer 6 and the buried layer 70 filled up in the opening 71 and the first via hole 72 into planarization so as to be flush with each other, as shown in FIG. 19.

The forming process then forms, on the intermediate layer 6 and the buried layer 70 obtained by planarization, the second short-circuit proof layer 11 face-to-face with the first short-circuit proof layer 9 of the first optical waveguide layer 4 with a photoconductive resin material such as $SiO_2$ and SiN or the resin material used for the optical wave guide layer. The second short-circuit proof layer 11 is also formed by patterning in a predetermined length in the optical signal transmission direction, more specifically, a length slightly larger than the length L of the above coupling section and also equal to that of the first short-circuit proof layer 9 by means of wet etching to the resin insulating layer.

Figure 20A:
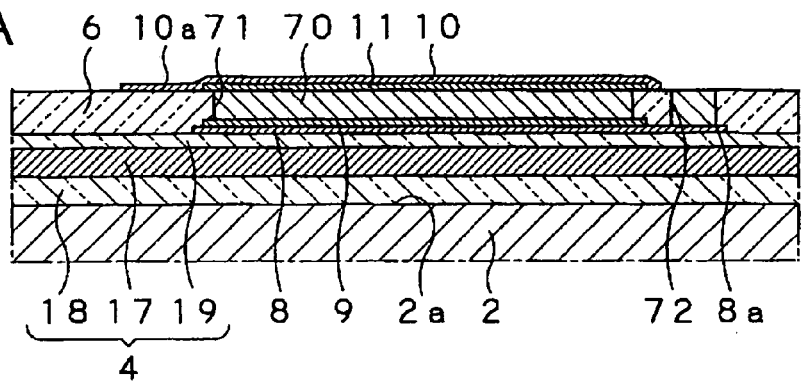
FIGS. 20(A) and 20(B) illustrate longitudinal cross-sectional views of a step of forming a second electrode layer and a second short-circuit proof layer of a second optical waveguide layer on the intermediate layer, according to a preferred embodiment of the present invention.
Figure 20B:
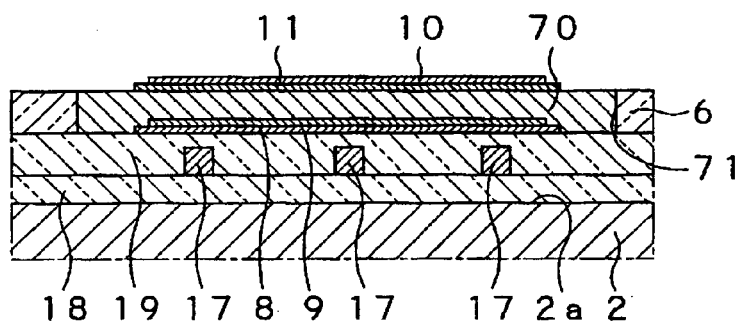

The forming process then forms, on the second short-circuit proof layer 11, the second electrode layer 10 face-to-face with the first electrode layer 8 of the first optical waveguide layer 4 with the ITO, as shown in FIG. 20. The second electrode layer 10 is also formed by patterning in a predetermined length in the optical signal transmission direction, more specifically, a length slightly larger than the length L of the above coupling section by means of wet etching to the ITO film. The second electrode layer 10 has a length substantially equal to that of the first electrode layer 8, more specifically, one end side 10a opposite to the projecting end side 8a is projecting from the second short-circuit proof layer 11, as shown in FIG. 20. The second electrode layer 10 makes the projecting one end side 10a be formed as the connection terminal section to be connected to the second via hole 13, as will be described later.

Figure 21A:
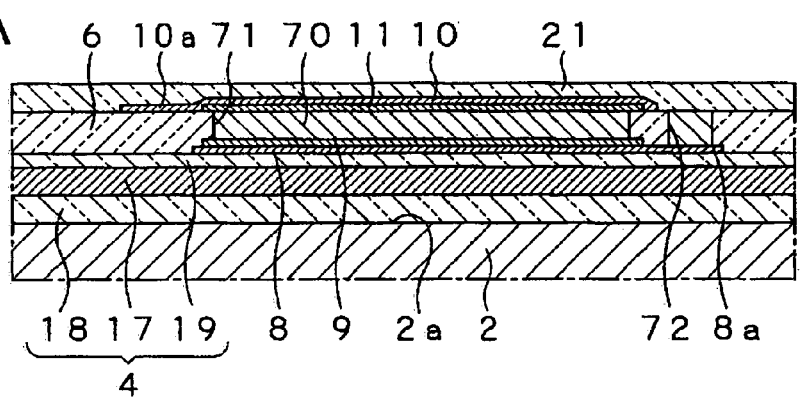
FIGS. 21(A) and 21(B) illustrate longitudinal cross-sectional views of a step of forming an upper clad layer on the intermediate layer.
Figure 21B:
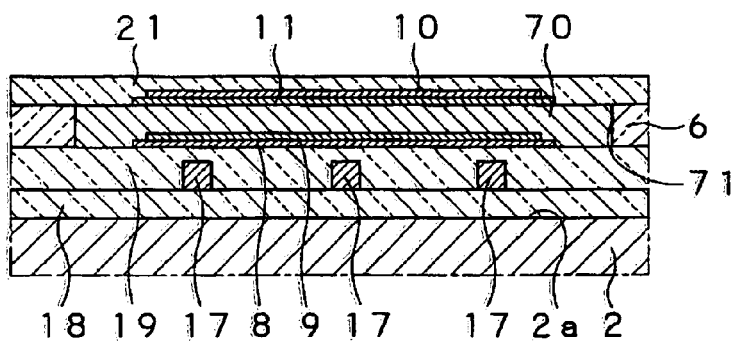

The forming process then forms precisely the second optical waveguide layer 5 on the intermediate layer 6 and the second electrode layer 10 obtained by planarization. The step of forming the second optical waveguide layer 5 includes a step of forming the upper clad layer 21, a step of forming the core 20 and a step of forming the lower clad layer 22. In the forming process, the upper clad layer 21 employs a photoconductive liquid resin material such as polyimide resin, epoxy resin, acrylic resin, polyolefin resin and rubber resin, and is formed by hardening the above resin material after coating thereof using a coating method such as spin coating that is effective in forming a uniform thickness layer, as shown in FIG. 21.

Figure 22A:
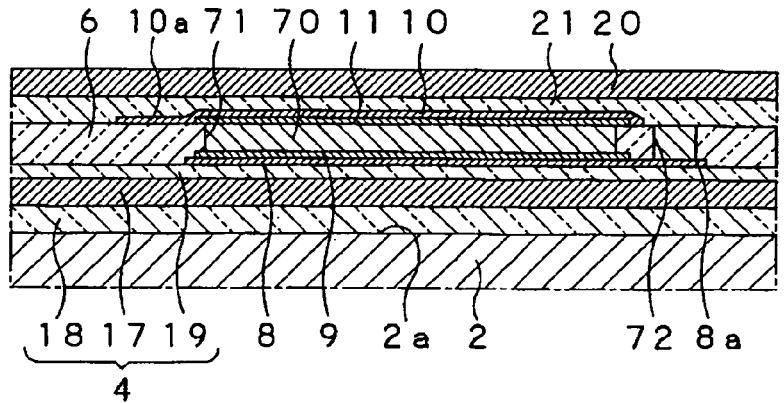
FIGS. 22(A) and 22(B) illustrate longitudinal cross-sectional views of a step of forming a core on the upper clad layer, according to a preferred embodiment of the present invention.
Figure 22B:
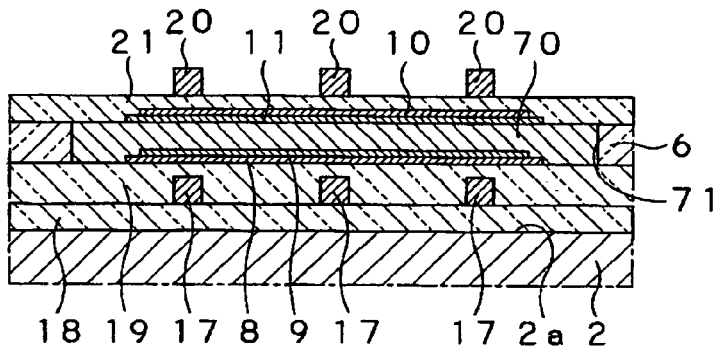

The forming process then forms the core 20 that is to form the plurality of discrete optical waveguides on the upper clad layer 21 as shown in FIG. 22. The core 20 employs a photoconductive photosensitive resin material whose refractive index is higher than that of the resin material for the upper clad layer 21, and is formed by patterning of each discrete optical waveguide, with the spacing kept not to make the discrete optical waveguides optically interfere each other, to a core resin material layer deposited on the upper clad layer 21 with the resin material coated in a predetermined thickness. The core 20 is formed so that the discrete optical waveguides respectively make pairs with the discrete optical waveguides of the first optical waveguide layer 4 in a vertical direction.

It is noted that when the same photosensitive resin material as that of the core 17 of the first optical waveguide layer 4 is used for the core 20, the core 20 is formed by means of dry etching or the like. As a matter of course, the core 20 may be also formed using other methods such as direct bonding of the core material to the upper clad layer 21 and filing of the resin material in patterned trenches directly formed on the upper clad layer 21, for instance.

Figure 23A:
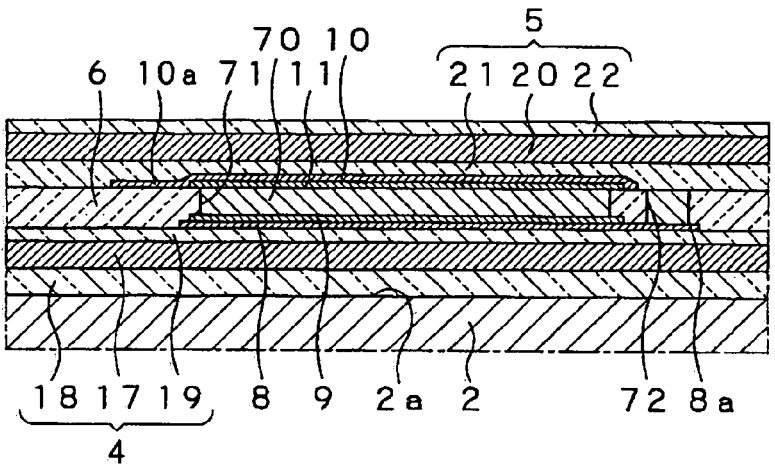
FIGS. 23(A) and 23(B) illustrate longitudinal cross-sectional views of a step of forming, on the upper clad layer, a lower clad layer to seal the core, according to a preferred embodiment of the present invention.
Figure 23B:
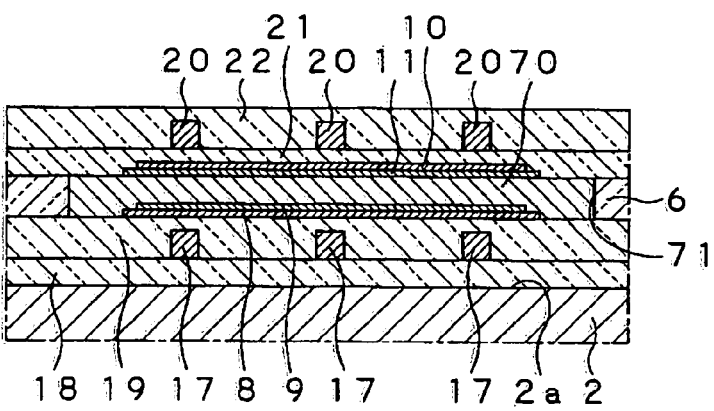

The forming process then forms, on the upper clad layer 21, the lower clad layer with the core 20 sealed up, as shown in FIG. 23. The lower clad layer 22 also employs a resin material whose refractive index is lower than that of the core 20, more specifically, a liquid resin material whose photoconductivity is similar to that of the upper clad layer 21, and is also formed by hardening the resin material after coating thereof on the surface of the upper clad layer 21 in a thickness sufficient to completely cover the core 20 using a coating method such as spin coating that is effective in forming a uniform thickness layer. With the above steps, the forming process forms, on the intermediate layer 6, the second optical waveguide layer 5 configured with the core 20 sealed by the upper clad layer 21 and the lower clad layer 22.

Figure 24A:
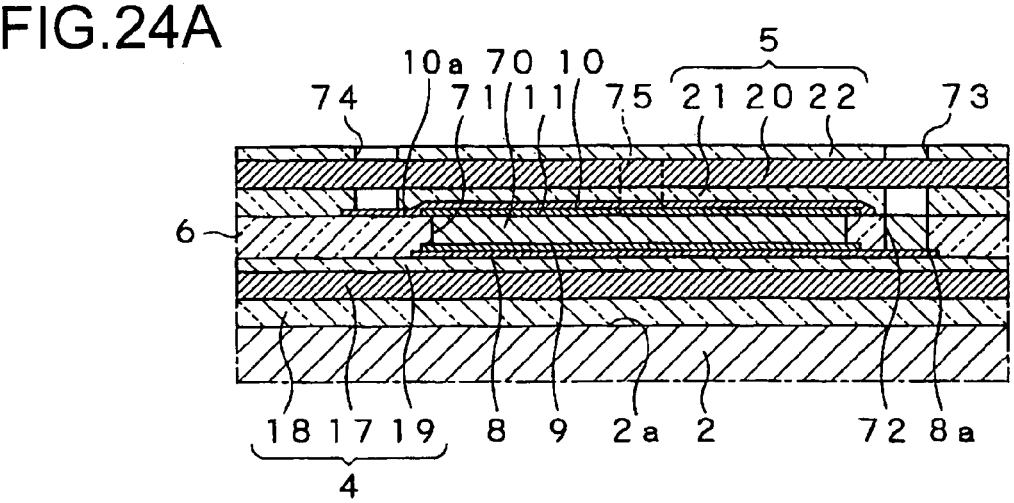
FIGS. 24(A) and 24(B) illustrate longitudinal cross-sectional views of a step of forming a second via hole, a third via hole and a copper extraction hole, according to a preferred embodiment of the present invention.
Figure 24B:
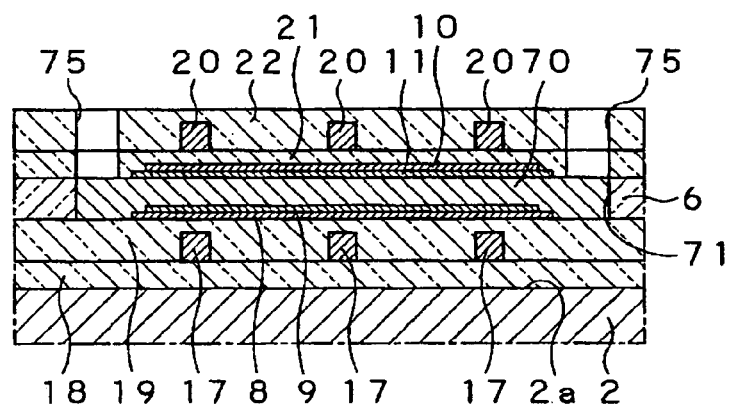

The forming process then forms the second via hole 73 and a third via hole 74, which are opened through the upper clad layer 21 and the lower clad layer 22 of the second optical waveguide layer 5, and copper extraction holes 75, which are communicating with the opening 71 in the intermediate layer 6, by patterning by means of etching or the like, as shown in FIG. 24. As a matter of course, these openings 73, 74 and the holes 75 are in positions that keep off from the core 20. In FIG. 24(B), there are shown two copper extraction holes 75 located at the opposite sides of the opening 71. Alternatively, it is also possible to form a single copper extraction hole or more than two.

The second via hole 73 is opened so as to communicate with the first via hole 72 that is opened in the intermediate layer 6 with the fill up material filled therein, providing the first via hole 12 in cooperation with the first via hole 72 as will be described later. The third via hole 74 is opened through the upper clad layer 21 and the lower clad layer 22 so as to expose the projecting one end side 10a of the second electrode layer 10 to the outside. In FIG. 24(B), there are shown a plurality of copper extraction holes 75 in positions at the outside of the second electrode layer 10 and the second short-circuit proof layer 11 so as to communicate with the opening 71 filled with the fill-up material.

Figure 25A:
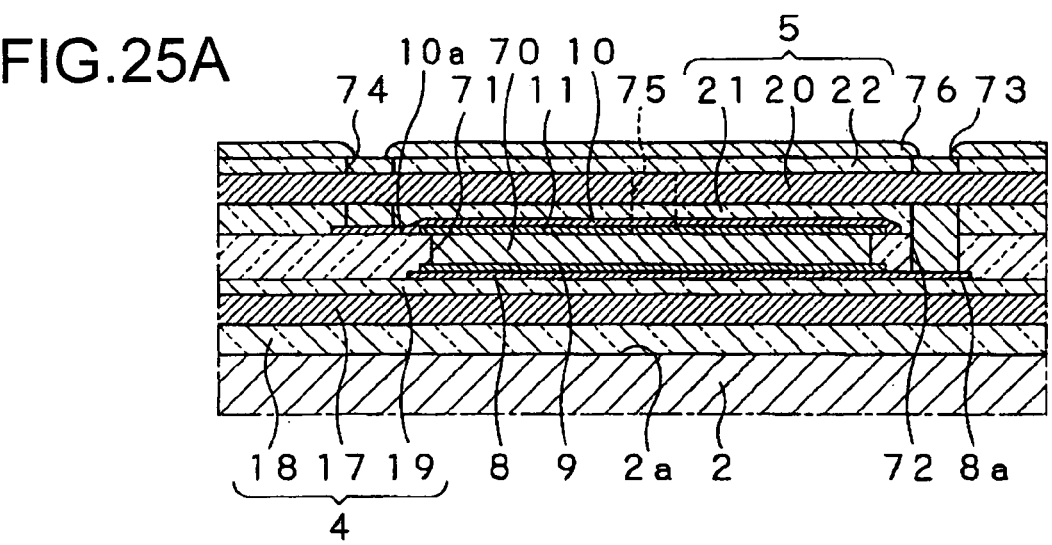
FIGS. 25(A) and 25(B) illustrate longitudinal cross-sectional views of, a step of forming a copper layer s to fill up the second via hole, the third via hole and the copper extraction hole, according to a preferred embodiment of the present invention.
Figure 25B:
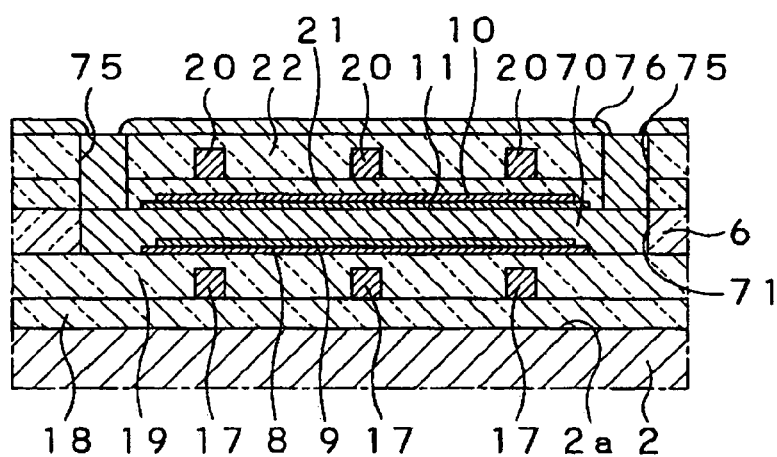
Figure 26A:
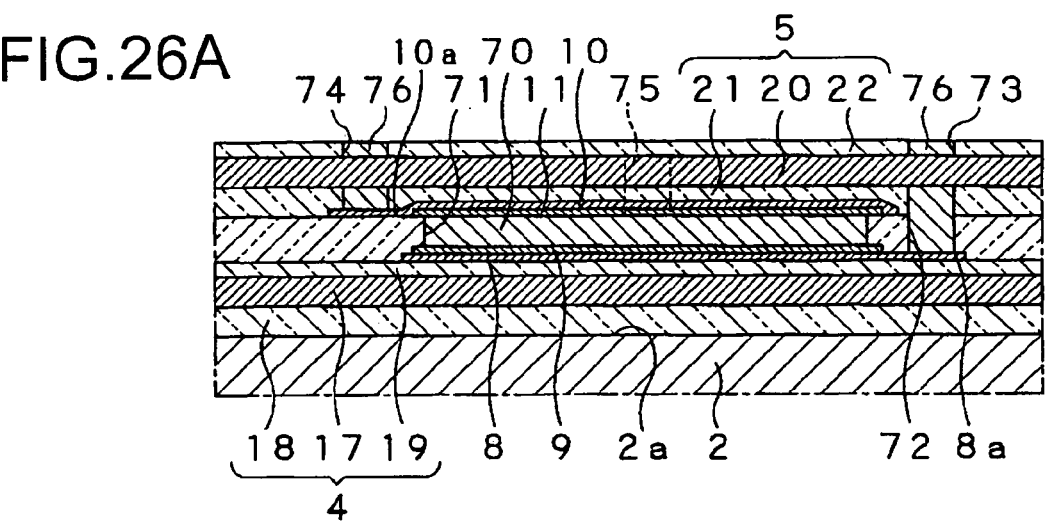
FIGS. 26(A) and 26(B) illustrate longitudinal cross-sectional views of a step of carrying out polishing of the copper layer, according to a preferred embodiment of the present invention.
Figure 26B:
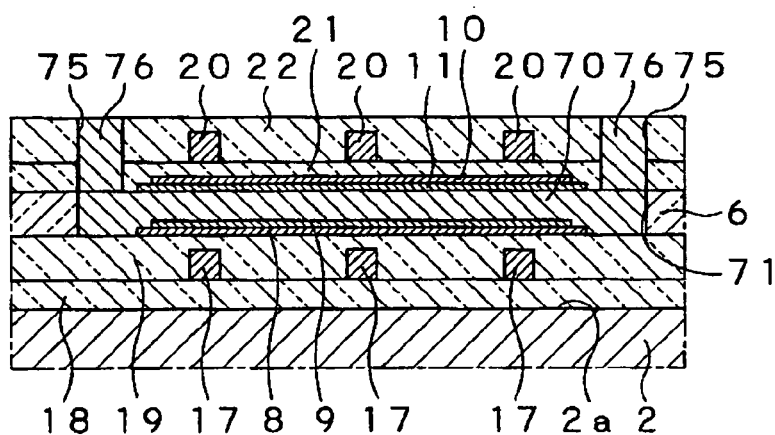

The fabrication process includes filling of the via holes 73, 74, and the holes 75 the holes with a copper layer 76 by applying electroless copper plating, for instance, to the second via hole 73 and the third via hole 74, together with the de-smearing treatment, as shown in FIG. 25. The copper layer 76 is integrated with the buried layer 70 including the copper layer filled in the first via hole 72 at the bottom of the second via hole 73. In addition, the copper layer 76 is also integrated with the buried layer 70 filled in the opening 71 at the bottom of the copper extraction hole 75. The copper layer 76 is also deposited in a small thickness on the lower clad layer 22 of the second optical waveguide layer 5.

In addition, the fabrication process includes chemical-mechanical polishing (CMP) to the copper layer 76 on the lower clad layer 22 into planarization. When the second optical waveguide layer 5 has thereon multi-layered optical waveguides or requires no electric circuit pattern, the forming process may eliminate a need for the step of polishing the copper layer 76 in particular.

Figure 27A:
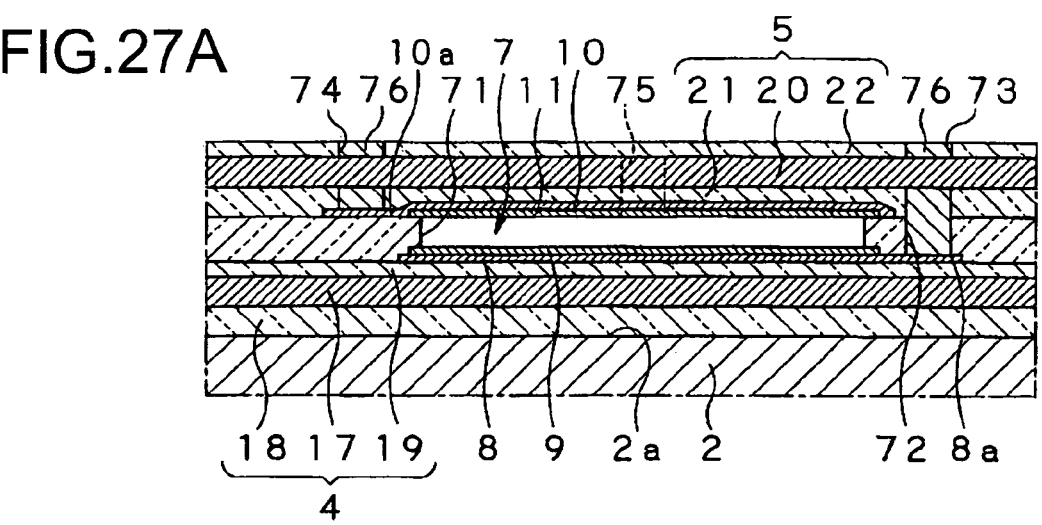
FIGS. 27(A) and 27(B) illustrate longitudinal cross-sectional views of a step of removing the copper layer from the gap section and the copper extraction hole, according to a preferred embodiment of the present invention.
Figure 27B:
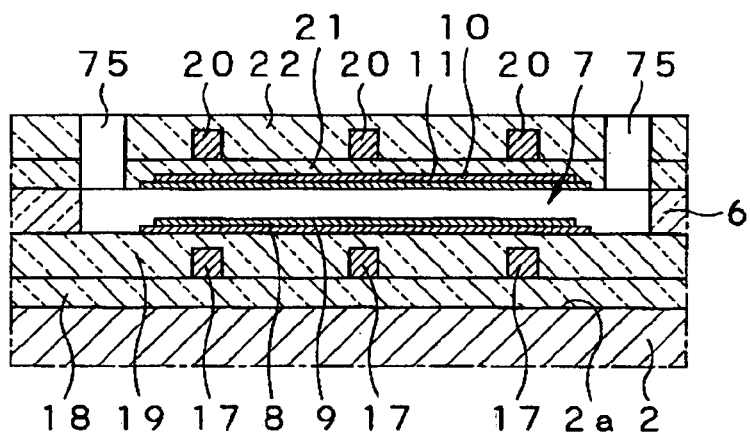

The fabrication process includes selective removal of only the buried layer 70 from the opening 71 and the copper layer 76 from the copper takeout holes 75 by means of etching, as shown in FIG. 27. In the etching, wet etching with an iron chloride solution, for instance, is applied to melt the copper that is to form the buried layer 70 and the copper of the copper layer 76 that is filled up in the copper extraction holes 75. The forming process forms the gap section 7 in the opening 71 by extracting the melted copper from the opening 71 through the copper extraction holes 75. In the etching, it is necessary to apply masking to the second via hole 73 and the third via hole 74 in advance to prevent the copper layer 76 filled up in these openings from melting. Alternatively, an etching solution used for the etching may employ an acid solution such as a nitric acid solution and a sulfuric acid solution, for instance.

As described above, the forming process forms an accurate first optical waveguide layer 4 using the substrate 2 having the surface 2a obtained by planarization, and also forms the second optical waveguide layer 5 deposited on the first optical waveguide layer 4 through the intermediate layer 6 so as to keep a predetermined layer-to-layer spacing and also to be partly face-to-face with the first optical waveguide layer 4 through the gap section 7, thereby providing the precise optical waveguide switch 1. Thus, the fabrication process enables the optical waveguide layers to be formed in multiple layers on the second optical waveguide layer 5 with the above steps.

The fabrication process also includes injection of the liquid 16 in the gap section 7 through the copper extraction holes 75, and sealing-up of each copper extraction holes 75 with the sealing cap 62, thereby providing the above optical waveguide switch 1.

While the buried layer 70 filled up in the opening 71 opened in the intermediate layer 6 plays an important functional role as a base portion for forming of the second optical waveguide layer 5 on the intermediate layer 6 in the course of the fabrication process, removal of the buried layer 70 forms the gap section 7. In the above fabrication process, the buried layer 70 is obtained by making use of the copper layers filled up in the first to third via holes 72 to 74 to form the first via hole 12 and the second via hole 13. However, it is noted that the buried layer 70 is by no means limited to the above copper layer. The buried layer 70 may be also one formed by dry etching or wet etching, for instance, with a selectively removable material such as appropriate metal material and resin material.

In the above mentioned preferred embodiments of the present invention, each optical waveguide is configured with a so-called optical confinement optical waveguide with the core sealed by clad materials different in refractive index from the material for the core. Alternatively, it is of course possible to use an appropriate optical waveguide such as a strip optical waveguide and a channel optical waveguide. In the above preferred embodiments, the optical waveguides facing each other with a predetermined layer-to-layer spacing kept through the intra-layer gap section have, on the faces confronting each other, the electrode layers, thereby providing the drive section for driving the optical waveguides into and out of contact with each other by the electrostatic force generated between the electrode layers. Alternatively, the drive section may be also of a structure for mechanically driving one optical waveguide by pressing, for instance.

In other words, the present invention has been disclosed by way of examples of preferred embodiments thereof, so that the description herein should not be construed as limiting the scope and spirit of the invention. It is therefore obvious to those skilled in the art that any modifications, variations, combination and sub-combinations may be applied to the preferred embodiments of the invention without departing from the scope thereof.

What is claimed is:

1. A method for manufacturing an optical waveguide switch, comprising the steps of:
    forming a first optical waveguide layer having a core layer sealed by a lower clad layer and an upper clad layer comprising photoconductive resin material;
    forming a first electrode layer on an upper clad layer of said first optical waveguide layer with a photoconductive electrode material;
    forming a first electrically insulating layer on at least a portion of said first electrode layer;
    forming an intermediate layer of a predetermined thickness on predetermined portions of said upper clad layer of said first optical waveguide layer, said first electrode layer and said first electrically insulating layer, but leaving gap portions overlying said insulating layer and a portion of said first electrode layer;
    filling said gap portions with a fill-up material to form a fill-up material layer;
    forming a second electrode layer facing said first electrode layer with a photoconductive electrode material across said intermediate layer and said fill-up material layer;
    forming a second electrically insulating layer over a portion of said second electrode layer;
    forming a second optical waveguide layer facing said first optical waveguide layer and having a core layer sealed by a lower clad layer and an upper clad layer comprising a photoconductive resin material on said upper clad layer including said second electrode layer, said upper clad layer of said second optical waveguide facing said upper clad layer of said first optical waveguide;
    forming first and second openings that extend from said outside said switch to said fist and second electrode layers, respectively, and third openings that extend to said fill-up material layer;
    filling said first and second openings with a suitable conductive material; and
    forming a gap section between said first and second electrode layers by removing said fill-up material from said fill-up material layer;
    wherein,
    said first optical waveguide layer and said second optical waveguide layer face each other having an interlayer spacing not permitting a spontaneous occurrence of a proximity effect perturbation, and
    optical signal switching or translation in said optical waveguide switch takes place by moving said first and second optical waveguide layers to a position where a proximity effect perturbation arises, by means of an electrostatic force generated by application of a voltage between said first electrode layer and said second electrode layer.

2. The method for manufacturing an optical waveguide switch according to claim 1, wherein optical waveguides are formed in multiple layers on the upper clad layer of said second optical waveguide layer by successively applying steps ranging from the step of forming said first optical waveguide layer to the step of forming said gap section.

3. The method for manufacturing an optical waveguide switch according to claim 1, wherein said first optical waveguide layer forming step and said first electrode layer forming step, as well as said second optical waveguide forming step and said second electrode layer forming step, comprise a plurality of optical waveguides formed in parallel with one another within a same layer.

4. The method for manufacturing an optical waveguide switch according to claim 1, wherein said intermediate layer forming step includes forming said intermediate layer with a photoconductive material having a refractive index substantially equal to a clad material for said optical waveguides.

5. The method for manufacturing an optical waveguide switch according to claim 1, wherein at least one of said first electrode layer forming step and said second electrode layer forming step includes forming a short-circuit proof layer on a surface of said electrode layer.

6. A method for manufacturing an optical waveguide switch, comprising the steps of:
    forming a first optical waveguide layer having a core layer sealed by a lower clad layer and an upper clad layer comprising photoconductive resin material;
    forming a first electrode layer on an upper clad layer of said first optical waveguide layer with a photoconductive electrode material;
    forming an intermediate layer of a predetermined thickness on predetermined portions of the upper clad layer of said first optical waveguide layer and said first electrode layer;
    filling a gap portion not covered by said intermediate layer with a fill-up material to form a fill-up material layer;
    forming a second electrode layer facing said first electrode layer with a photoconductive electrode material across said intermediate layer and said fill-up material layer;
    forming a second optical waveguide layer facing said first optical waveguide layer and having a core layer sealed by a lower clad layer and an upper clad layer comprising a photoconductive resin material on said upper clad layer including said second electrode layer, said upper clad layer of said second optical waveguide facing said upper clad layer of said first optical waveguide; and forming a gap section between said first and second electrode layers by removing said fill-up material from said fill-up material layer;

wherein, said first optical waveguide layer and said second optical waveguide layer face each other having an interlayer spacing not permitting a spontaneous occurrence of a proximity effect perturbation, optical signal switching or translation in said optical waveguide switch takes place by moving said first and second optical waveguide layers to a position where a proximity effect perturbation arises, by means of an electrostatic force generated by application of a voltage between said first electrode layer and said second electrode layer, said intermediate layer forming step includes forming a first via hole open through said intermediate layer up to said first electrode layer;

said second optical waveguide layer forming step includes forming a second via hole open through said lower clad layer and said upper clad layer up to said second electrode layer, and a third via hole communicating with said first via hole; and conduction treatment is applied to said first, second and third via holes to form, on said upper clad layer, a via hole for connection between said first electrode layer and said second electrode layer.

7. The method for manufacturing an optical waveguide switch according to claim 6, wherein said fill-up material filling step includes filling said gap section and said first via hole with a fill-up material comprising copper.

8. The method for manufacturing an optical waveguide switch according to claim 7, wherein said fill-up material filling step further includes polishing said upper clad layer of said first optical waveguide layer and said fill-up material layer so as to constitute a flat plane with one another.

9. The method for manufacturing an optical waveguide switch according to claim 7, wherein said second optical waveguide layer forming step includes forming an etching hole opened through said lower clad layer and said upper clad layer up to said fill-up material layer, and removing said fill-up material from said gap section by applying etching to said fill-up material layer through said etching hole.

10. The method for manufacturing an optical waveguide switch according to claim 9, wherein said second optical waveguide layer forming step further includes the steps of filling liquid into said gap section through said etching hole, and closing said etching hole.

* * * * *